United States Patent
Nijs

(10) Patent No.: US 10,895,908 B2
(45) Date of Patent: Jan. 19, 2021

(54) TARGETING SACCADE LANDING PREDICTION USING VISUAL HISTORY

(71) Applicant: Tobii AB, Danderyd (SE)

(72) Inventor: Daan Nijs, Stockholm (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/199,819

(22) Filed: Nov. 26, 2018

(65) Prior Publication Data

US 2019/0094963 A1 Mar. 28, 2019

Related U.S. Application Data

(63) Continuation-in-part of application No. 16/132,656, filed on Sep. 17, 2018, now abandoned, which is a
(Continued)

(51) Int. Cl.
*G06F 3/01* (2006.01)
*G06F 3/039* (2013.01)
(Continued)

(52) U.S. Cl.
CPC .............. *G06F 3/013* (2013.01); *G06F 3/039* (2013.01); *G06F 3/147* (2013.01); *G06K 9/00* (2013.01);
(Continued)

(58) Field of Classification Search
None
See application file for complete search history.

(56) References Cited

U.S. PATENT DOCUMENTS

| 4,348,186 A | 9/1982 | Harvey et al. |
| 4,836,670 A | 6/1989 | Hutchinson |

(Continued)

FOREIGN PATENT DOCUMENTS

| DE | 19731301 A1 | 7/1998 |
| EP | 1854516 A1 | 11/2007 |

(Continued)

OTHER PUBLICATIONS

Frintrop, Simone, Erich Rome, and Henrik I. Christensen. "Computational visual attention systems and their cognitive foundations: A survey." ACM Transactions on Applied Perception (TAP) 7.1 (2010): 1-39.*

(Continued)

*Primary Examiner* — Ryan M Gray
(74) *Attorney, Agent, or Firm* — Samuel Yamron

(57) ABSTRACT

According to the invention, techniques for refining a ballistic prediction are described. In an example, an eye tracking system may record images over time of content presented on a display. Saccade data may be received and used as a trigger to retrieve particular ones of the recoded images. The eye tracking system may compare the images to identify a change in the content. The location of this change may correspond to a sub-area of the display. The output of the ballistic prediction may include a landing point that represents an anticipated gaze point. This landing point may be adjusted such that a gaze point is now predicted to fall within the sub-area when the change is significant.

19 Claims, 16 Drawing Sheets

Related U.S. Application Data continuation of application No. 15/476,650, filed on Mar. 31, 2017, now Pat. No. 10,082,870, which is a continuation-in-part of application No. 15/270,783, filed on Sep. 20, 2016, now Pat. No. 9,898,081, which is a continuation-in-part of application No. 14/197,171, filed on Mar. 4, 2014, now Pat. No. 9,665,171.

(60) Provisional application No. 61/772,366, filed on Mar. 4, 2013.

(51) Int. Cl.
    *G09G 5/373* (2006.01)
    *G09G 5/37* (2006.01)
    *G06T 5/00* (2006.01)
    *G06K 9/00* (2006.01)
    *G06F 3/147* (2006.01)

(52) U.S. Cl.
CPC ..... *G06K 9/00604* (2013.01); *G06K 9/00671* (2013.01); *G06T 5/00* (2013.01); *G09G 5/37* (2013.01); *G09G 5/373* (2013.01); *G06F 2203/011* (2013.01); *G09G 2320/0261* (2013.01); *G09G 2320/103* (2013.01); *G09G 2354/00* (2013.01)

(56) References Cited

U.S. PATENT DOCUMENTS

| | | |
|---|---|---|
| 5,218,387 A | 6/1993 | Ueno |
| 5,294,427 A | 3/1994 | Sasaki |
| 5,583,795 A | 12/1996 | Smyth |
| 5,638,176 A | 6/1997 | Hobbs |
| 6,028,608 A | 2/2000 | Jenkins |
| 6,152,563 A | 11/2000 | Hutchinson |
| 6,182,114 B1 | 1/2001 | Yap et al. |
| 6,204,828 B1 | 3/2001 | Amir |
| 6,252,989 B1 | 6/2001 | Geisler et al. |
| 6,259,795 B1 | 7/2001 | McGrath |
| 6,351,335 B1 | 2/2002 | Perlin |
| 6,421,185 B1 | 7/2002 | Wick et al. |
| 6,421,604 B1 | 7/2002 | Koyanagi |
| 6,608,615 B1 | 8/2003 | Martins |
| 6,675,075 B1 | 1/2004 | Engelsberg |
| 6,798,443 B1 | 9/2004 | Maguire, Jr. |
| 7,027,655 B2 | 4/2006 | Keeney et al. |
| 7,561,143 B1 | 7/2009 | Milekic |
| 7,572,008 B2 | 8/2009 | Elvesjo et al. |
| 7,573,439 B2 | 8/2009 | Lau et al. |
| 7,602,924 B2 | 10/2009 | Kleen |
| 7,668,317 B2 | 2/2010 | Yang |
| 7,850,306 B2 | 12/2010 | Uusitalo et al. |
| 8,020,993 B1 | 9/2011 | Fram |
| 8,775,975 B2 | 7/2014 | Karmarkar et al. |
| 8,902,970 B1* | 12/2014 | McCuller ............ A63F 13/00 375/240.02 |
| 9,055,157 B2 | 6/2015 | Miyazawa |
| 9,143,880 B2 | 9/2015 | Vennstrom |
| 9,313,481 B2 | 4/2016 | Sylvan |
| 9,423,871 B2 | 8/2016 | Sukumar |
| 9,638,495 B2 | 5/2017 | Stanley |
| 9,665,171 B1 | 5/2017 | Skogo et al. |
| 9,727,991 B2 | 8/2017 | Guenter et al. |
| 9,740,452 B2 | 8/2017 | Vennstrom |
| 9,898,081 B2 | 2/2018 | Thunström et al. |
| 10,082,870 B2 | 9/2018 | Thunström et al. |
| 2003/0067476 A1 | 4/2003 | Miller |
| 2004/0207635 A1 | 10/2004 | Miller et al. |
| 2004/0227699 A1 | 11/2004 | Mitchell |
| 2005/0018911 A1 | 1/2005 | Deever |
| 2005/0047624 A1 | 3/2005 | Kleen |
| 2006/0140420 A1 | 6/2006 | Machida |
| 2008/0111833 A1 | 5/2008 | Thorn et al. |
| 2009/0023498 A1 | 1/2009 | Nakayama |
| 2010/0061553 A1 | 3/2010 | Chaum |
| 2010/0086221 A1* | 4/2010 | Stankiewicz ........ G06K 9/4671 382/224 |
| 2011/0085700 A1 | 4/2011 | Lee |
| 2012/0044365 A1 | 2/2012 | Shuster |
| 2012/0105310 A1 | 5/2012 | Sverdrup et al. |
| 2012/0146891 A1 | 6/2012 | Kalinli |
| 2012/0156652 A1 | 6/2012 | Lane et al. |
| 2012/0163606 A1 | 6/2012 | Eronen |
| 2012/0257036 A1 | 10/2012 | Stenberg |
| 2013/0187835 A1* | 7/2013 | Vaught ............... G06K 9/00604 345/8 |
| 2013/0201305 A1 | 8/2013 | Sibecas |
| 2013/0208926 A1 | 8/2013 | Vincent |
| 2013/0321265 A1 | 12/2013 | Bychkov et al. |
| 2013/0342539 A1* | 12/2013 | Khan ................... G06T 11/00 345/440 |
| 2014/0010391 A1 | 1/2014 | Ek |
| 2014/0043227 A1 | 2/2014 | Skogo |
| 2014/0079297 A1 | 3/2014 | Tadayon |
| 2014/0092006 A1 | 4/2014 | Boelter |
| 2014/0096077 A1* | 4/2014 | Jacob .................. G06F 3/013 715/810 |
| 2014/0240442 A1 | 8/2014 | Shuster |
| 2014/0247277 A1 | 9/2014 | Guenter et al. |
| 2014/0328505 A1 | 11/2014 | Heinemann |
| 2014/0362201 A1 | 12/2014 | Nguyen |
| 2015/0055808 A1 | 2/2015 | Vennstrom |
| 2015/0058812 A1 | 2/2015 | Lindh |
| 2015/0199559 A1 | 7/2015 | Sztuk |
| 2015/0205126 A1 | 7/2015 | Schowengerdt |
| 2015/0253937 A1 | 9/2015 | Kim |
| 2015/0338915 A1 | 11/2015 | Publicover |
| 2015/0362991 A1 | 12/2015 | Koga et al. |
| 2016/0105757 A1 | 4/2016 | Vennstrom |
| 2016/0132289 A1 | 5/2016 | Vennstrom |
| 2017/0011492 A1 | 1/2017 | Thunstrom |
| 2017/0123492 A1 | 5/2017 | Marggraff |
| 2017/0235362 A1 | 8/2017 | Thunstrom |
| 2017/0287112 A1 | 10/2017 | Stafford |
| 2017/0287446 A1 | 10/2017 | Young |
| 2018/0199041 A1* | 7/2018 | McCuller .............. A63F 13/00 |
| 2019/0384392 A1* | 12/2019 | Aimone ............... G06F 3/0487 |

FOREIGN PATENT DOCUMENTS

| | | |
|---|---|---|
| EP | 3036620 B1 | 3/2017 |
| WO | 1998/33315 A2 | 7/1998 |
| WO | 2008/134014 | 11/2008 |
| WO | 2011049988 A | 3/2011 |
| WO | 2015/027241 A1 | 2/2015 |
| WO | 2015/133889 A1 | 9/2015 |
| WO | 2018/057450 A1 | 3/2018 |

OTHER PUBLICATIONS

Böhme, Martin, et al. "Eye movement predictions enhanced by saccade detection." In: Brain Inspired Cognitive Systems (2004): 1-7.*

Peters, Robert J., and Laurent Itti. "Beyond bottom-up: Incorporating task-dependent influences into a computational model of spatial attention." 2007 IEEE conference on computer vision and pattern recognition. IEEE, 2007.*

Non-Final Office Action dated May 14, 2019 in related U.S. Appl. No. 16/132,656, 12 pgs.

Final Office Action dated Aug. 22, 2019 in related U.S. Appl. No. 15/864,858, 9 pgs.

Arnow et al., "Foveated Visual Search for Corners", IEEE Transactions on Image Processing, vol. 16 Issue: 3, Mar. 2007, pp. 813-823.

Guenter et al., "Foveated 3D Graphics", Microsoft Research, Retrieved from the internet: https://www.microsoft.com/en-us/research/publication/foveated-3d-graphics/, Nov. 20, 2012, 10 pages.

Loschky and Wolverton, "How Late Can You Update Gaze-Contingent Multiresolutional Displays Without Detection?", ACM

(56) References Cited

OTHER PUBLICATIONS

Transactions on Multimedia Computing, Communications and Applications, v. 3, No. 4, art. 25 (Dec. 2007). (Year: 2007).
Nystrom et al., "Effect of Compressed Offline Foveated Video on Viewing Behavior and Subjective Quality", ACM Transactions on Multimedia Computing, Communications and Applications. vol. 6, issue 1, Feb. 2010, pp. 4:1-4:14.
Reingold et al., "Gaze-Contingent Multiresolutional Displays: An Integrative Review", Summer 2003—Human Factors, vol. 45, No. 2, 2003, pp. 307-327.
U.S. Appl. No. 14/197,171, Advisory Action dated Dec. 13, 2016, 5 pages.
Bhonde, "Turing Variable Rate Shading in VRWorks" (https://devblogs.nvidia.com/turing-variablerate-shading-vrworks/), Sep. 24, 2018, all pages.
U.S. Appl. No. 14/197,171, Final Office Action dated Jul. 28, 2016, 2 pages.
U.S. Appl. No. 14/197,171, Non-Final Office Action dated Dec. 24, 2015, 11 pages.
U.S. Appl. No. 14/197,171, Notice of Allowance dated Jan. 27, 2017, 9 pages.
International Preliminary Report on Patentability dated Mar. 26, 2019 in related PCT application No. PCT/US2017/051993, 11 pgs.
U.S. Appl. No. 15/270,783, Ex Parte Quayle Action dated May 11, 2017, 9 pages.
U.S. Appl. No. 15/270,783, Non-Final Office Action dated Jan. 5, 2017, 15 pages.
Final Office Action dated Oct. 11, 2017 in related U.S. Appl. No. 14/167,877, all pgs.
Notice of Allowance dated May 21, 2018 in related U.S. Appl. No. 15/476,650, all pgs.
International Search Report and Written Opinion dated Jan. 29, 2018 in related PCT application No. PCT/US2017/051993, all pgs.
Loschy, McConcie, Yang, and Miller, "The limits of visual resolution in natural scene viewing", Visual Cognition, 2005, 12 (6), 1057-265 427 1092. (Year: 2005).
Non-Final Office Action dated Jan. 19, 2017 in related U.S. Appl. No. 14/467,877, all pgs.
Notice of Allowance dated Apr. 17, 2015 in related U.S. Appl. No. 14/467,944, all pgs.
Non-Final Office Action dated Oct. 20, 2016 in related U.S. Appl. No. 14/467,944, all pgs.
Notice of Allowance dated Apr. 14, 2017 in related U.S. Appl. No. 14/859,945, all pgs.
Non-Final Office Action dated Oct. 27, 2016 in related U.S. Appl. No. 14/859,945, all pgs.
Notice of Allowance dated Jun. 15, 2018 in related U.S. Appl. No. 14/982,844, all pgs.
Final Rejection dated Nov. 27, 2017 in related U.S. Appl. No. 14/982,844, all pgs.
Non-Final Office Action dated Jun. 15, 2017 in related U.S. Appl. No. 14/982,844, all pgs.
Notice of Allowance dated Sep. 27, 2017 in related U.S. Appl. No. 15/270,783, all pgs.
International Search Report and Written Opinion dated Nov. 18, 2014 in related PCT application No. PCT/US2014/052562, all pgs.
International Preliminary Report on Patentability dated Mar. 3, 2016 in related PCT application No. PCT/US2014/052562, all pgs.
"Nvidia Variable Rate Shading—Feature Overview", Sep. 2018, DU-09204-001-v01, all pages.
International Preliminary Report on Patentability dated Apr. 4, 2019 in related PCT application No. PCT/US2017/051993, all pgs.
Non-Final Office Action dated Jan. 31, 2020 in related U.S. Appl. No. 16/208,323, all pgs.

\* cited by examiner

TARGETING SACCADE LANDING PREDICTION USING VISUAL HISTORY

CROSS-REFERENCE TO RELATED APPLICATIONS

This application is a continuation-in-part of U.S. patent application Ser. No. 16/132,656, filed Sep. 17, 2018, which is a continuation of U.S. patent application Ser. No. 15/476,650, filed Mar. 31, 2017, which is a continuation-in-part of U.S. patent application Ser. No. 15/270,783, filed Sep. 20, 2016, which is a continuation-in-part of U.S. patent application Ser. No. 14/197,171, filed Mar. 4, 2014, which claims priority to Provisional U.S. Patent Application No. 61/772,366, filed Mar. 4, 2013, the entire disclosures of which are hereby incorporated by reference, for all purposes, as if fully set forth herein.

BACKGROUND OF THE INVENTION

Graphical items may be used on a display to show data and information to a viewer. These graphical items may include text, images, and video. Graphical items in the area of computing are well known and have been in use for many years. Recently, showing three dimensional (3D) graphical items on a display has increased in importance in areas such as gaming, modeling and movies.

When displaying graphical items, a system such as a computer uses a processor in combination with memory to display the items on a screen or other display device. Methods for displaying graphical items vary, but typically they rely on a computer interpreting commands to control a graphics processing device that provides graphical items for display. The graphics processing device typically contains custom hardware for this purpose including a processor and memory. In some computer systems the graphics processing device is fully integrated, and in others it is provided as a separate component known as a graphics card.

Graphics processing devices have limits on their processing power, usually quantified in terms of the amount of graphical items that can be displayed on a screen at any given time. This is typically limited by the capabilities of the hardware embodying the graphics processing device, including processors, memory, and communication channels. Additionally, the amount of graphical items able to be displayed on a screen at a given point can be limited by communication limits between the graphics processing device and computer.

In many scenarios that require graphical items to be displayed on a screen, a user only focuses on a portion of the screen, and therefore only a portion of the graphical items, an any given time. Meanwhile, other graphical items continue to be displayed on the remaining portions of the screen, which the user is not focused on. This wastes valuable graphics processing device resources to produce graphical items that cannot be fully appreciated by the user because the visual acuity of a human drops dramatically outside those images immediately focused on.

BRIEF DESCRIPTION OF THE INVENTION

In some embodiments, systems and methods for predicting gaze points are described. The predicted gazes point may be used to modify or present content, such as for foveated rendering. In an example, an eye tracking system records, in storage, a first image and a second image of content presented at a display. The system receives saccade data indicating a user saccade and, based on receiving the saccade data, accesses the first image and the second image from the storage. Further, the system compares the first image and the second image accessed from the storage to determine a change in the content. Based on the saccade data and the change, the gaze point predicts a gaze point on the display.

To illustrate, foveated rendering may be supported by using ballistic prediction to predict where a gaze point will land on a display. By also detecting a change in the content presented on the display using the visual history available from the recorded images, the prediction of the gaze point can be improved by nudging the gaze point to land in an area having a large content change, where this ara may have likely attracted the user's attention.

BRIEF DESCRIPTION OF THE DRAWINGS

The present invention is described in conjunction with the appended figures.

Figure 1:
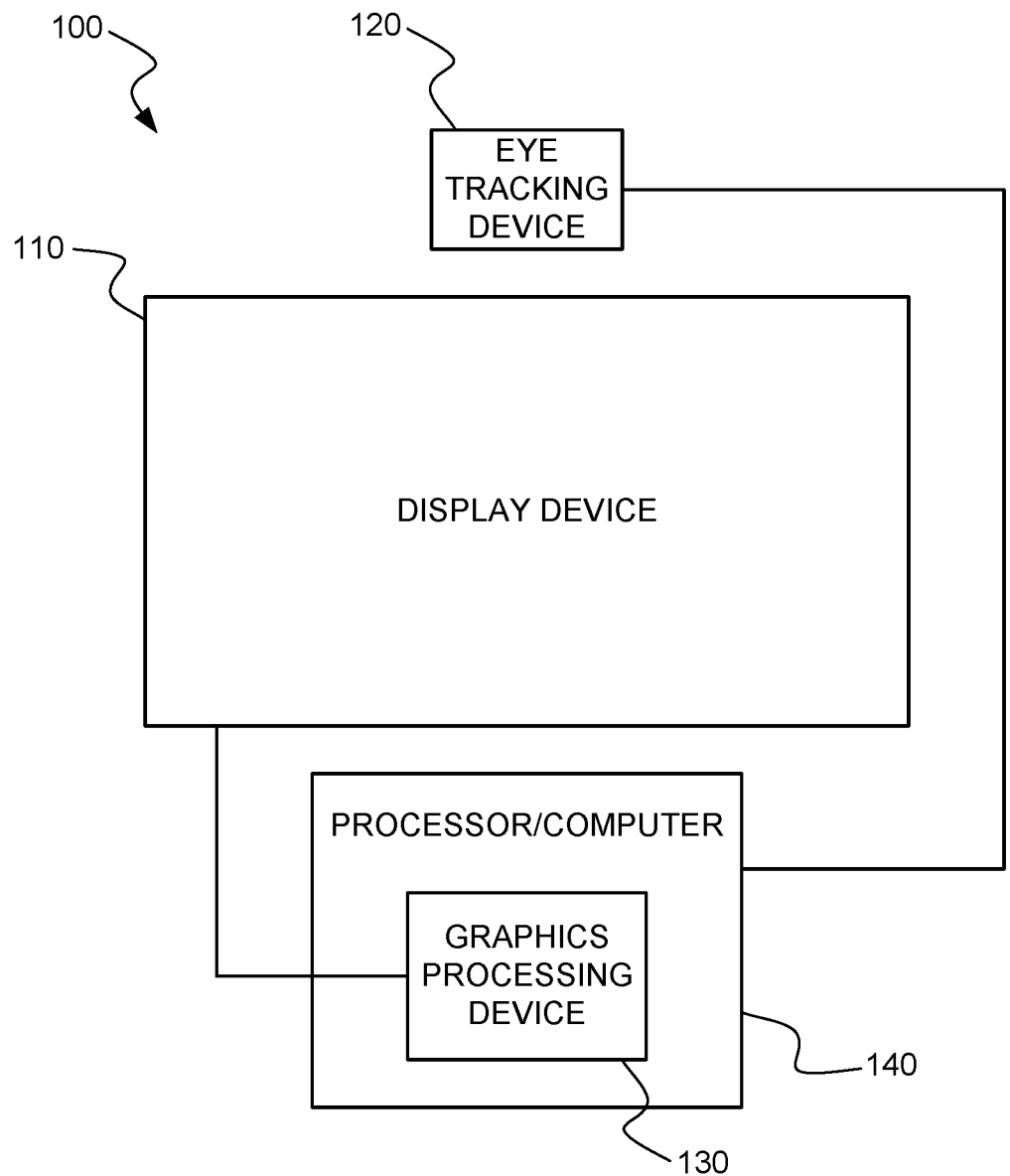
FIG. 1 is a block diagram of one possible system of the invention for modifying an image based on a user's gaze point.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function. Any detail present in one discussed embodiment may or may not be present in other versions of that embodiment or other embodiments discussed herein.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In some embodiments of the invention, and with reference to FIG. 1, a system 100 for presenting graphics on a display device 110 is provided. System 100 may include an eye tracking device 120 and a graphics processing device 130. In some embodiments, the system may also include a processor/computer 140 which communicates with, and controls, graphics processing device 130. In some embodiments, any function of graphics processing device 130 may be performed, in whole or in part, by processor/computer 140. Merely by way of example, eye tracking device 120 may be provided integral to, or in addition to, a personal computer 140 having graphics processing device 130 and a central processing unit (in some configurations, graphics processing device 130 and the central processing unit are integrated). In other embodiments, eye tracking device 120 may be provided integral to, or in addition to, a gaming console 140 or other device having graphics processing device 130 and a central processing unit. Examples of gaming consoles include those produced and available from Microsoft™, Nintendo™, or Sony™. In other embodiments, the eye tracking device 120 may be provided integral to, or in addition to, a wearable headset such as a Virtual Reality (VR) or Augmented Reality (AR) or the like. Examples of wearable headsets include those produced and available under the names Oculus Rift™, HTC Vive™, Sony PlaystationVR™ and Fove™. Thus, embodiments of the invention may be applied to the presentation of graphics in any number of possible devices and applications, including video display, video games, video production and editing, video communications, computer aided drafting and design, etc.

Eye tracking device 120 may be for determining at least one of a gaze point of a user on display device 110, or a change in the gaze point of the user on display device 110. Eye tracking devices and methods, sometimes referred to as gaze detection systems and methods, include, for example, products produced and available from Tobii Technology AB, and which operate by using infrared illumination and an image sensor to detect reflection from the eye of a user. An example of such a gaze detection system is described in U.S. Pat. No. 7,572,008, which is hereby incorporated by reference, for all purposes, as if fully set forth herein. Other alternative gaze detection systems may also be employed by the invention, regardless of the technology behind the gaze detection system. Eye tracking device 120 may employ its own processor or the processor of another device (i.e., processor/computer 140) to interpret and process data received. When an eye tracking device is referred to herein, both possible methods of processing data are referred to.

Graphics processing device 130 employed by various embodiments of the invention may be for causing an image to be displayed on display device 110. Graphics processing device 130 may modify what image is displayed on display device 110 based at least in part on the gaze point of the user on display device 110, or a change in the gaze point of the user on display device 110, as determined by eye tracking device 120. While in some embodiments a separate non-included or non-integrated display device will be controlled by the graphics processing device 130, other embodiments may include or integrate display device 110.

Figure 2:
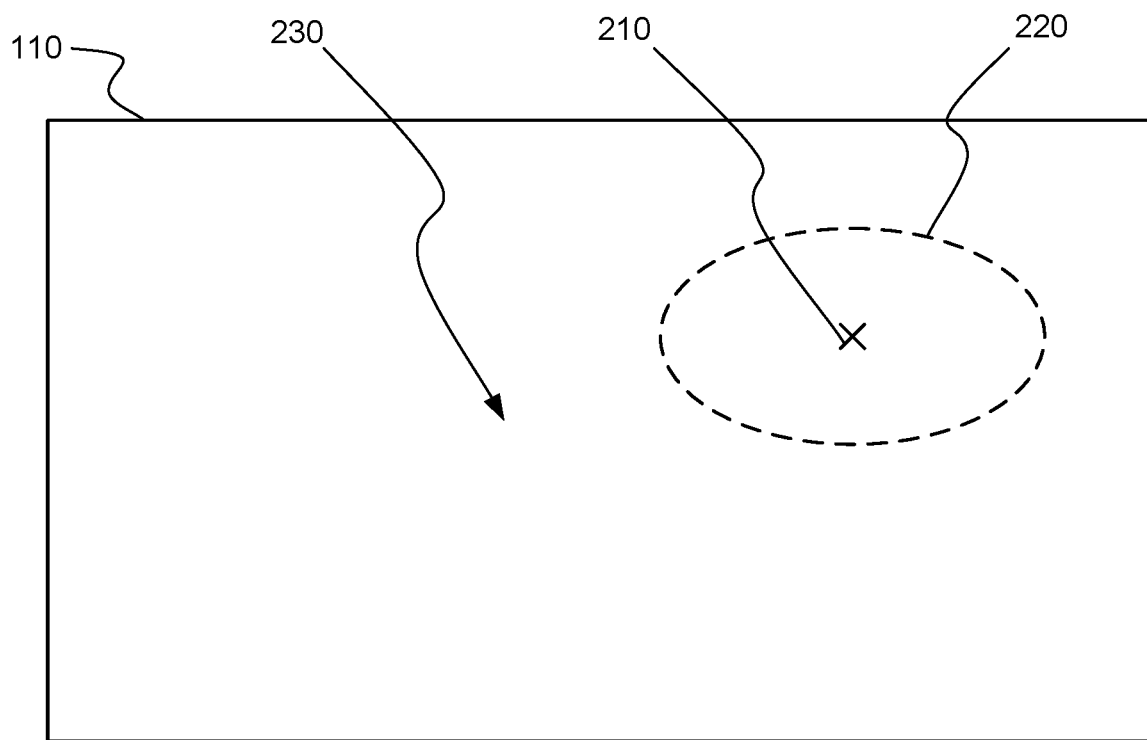
FIG. 2 is a view of a display device of the invention in which image modification is occurring in response to a user's gaze point.

The way in which the image displayed on display device 110 may be modified by graphics processing device 130 may vary depending on the embodiment, but regardless, the way in which the image is displayed may be intended to increase the image quality of portions of the image on which a user's gaze, or focused gaze, is directed, relative to those portions of the image to which the user's gaze, or focused gaze, is not directed. In this manner, the use of available resources of graphics processing device 130, and/or other system resources, are maximized to deliver image quality where it matters most on display device 110. To demonstrate, FIG. 2 illustrates a display device 110 showing a user's gaze point 210 and an area 220 around user's gaze point 210 in which embodiments of the invention may increase the quality of the image relative to the remaining area 230 of the display device 110. Thus, in various embodiments of the invention, the quality of the image produced across display device 110 may be increased in area 220 relative to remaining area 230.

When "modification" of an image presented on display device 110 is discussed herein, it shall be understood that what is intended is that a subsequent image displayed on display device 110, is different than a prior image displayed on display device 110. Thus, graphics processing device 130 and display device 110, or other device(s) discussed herein, "modify" an image by causing a first image to be displayed and then a second image to be displayed which is different than the first image. Any other change of an image discussed herein, for example, increasing or decreasing of image quality, shall also be understood to mean that a subsequent image is different than a prior image. Note that a change or modification of an image may include changing or modifying only a portion of the image. Thus, some portions of a prior image may be the same as a subsequent image, while other portions may be different. In other situations, the entirety of a prior image may be different than a subsequent image. It shall be understood that the modification of an area or an entirety of an image does not necessarily mean every finite portion of the area or entirety are changed (for example, each pixel), but rather that the area or entirety may be changed in some potentially consistent, predefined, or ordered manner (for example, the quality of the image is changed).

Increasing the quality of the image may include increasing the quality of any one or more of the below non-exclusive list of graphical characteristics, and/or modifying the content of the graphics, in addition to other possible characteristics known in the art:

Resolution: The number of distinct pixels that may be displayed in one or more dimensions. For example, "1024×768" means 1024 pixels displayed in height and 768 pixels displayed in width.

Shading: Variation of the color and brightness of graphical objects dependent on the artificial lighting projected by light sources emulated by graphics processing device 130.

Texture-mapping: The mapping of graphical images or "textures" onto graphical objects to provide the objects with a particular look. The resolution of the textures influence the quality of the graphical object to which they are applied.

Bump-mapping: Simulation of small-scale bumps and rough gradients on surfaces of graphical objects.

Fogging/participating medium: The dimming of light when passing through non-clear atmosphere or air.

Shadows: Emulation of obstruction of light.

Soft shadows: Variance in shadowing and darkness caused by partially obscured light sources.

Reflection: Representations of mirror-like or high gloss reflective surfaces.

Transparency/opacity (optical or graphic): Sharp transmission of light through solid objects.

Translucency or Opacity: Highly scattered transmission of light through solid objects.

Refraction: Bending of light associated with transparency.

Diffraction: Bending, spreading and interference of light passing by an object or aperture that disrupts the light ray.

Indirect illumination: Surfaces illuminated by light reflected off other surfaces, rather than directly from a light source (also known as global illumination).

Caustics (a form of indirect illumination): Reflection of light off a shiny object, or focusing of light through a transparent object, to produce bright highlights on another object.

Anti-aliasing: The process of blending the edge of a displayed object to reduce the appearance of sharpness or jagged lines. Typically an algorithm is used that samples colors around the edge of the displayed object in to blend the edge to its surroundings.

Frame rate: For an animated image, the number of individual frames presented during a certain period of time to render movement within the image.

3D: Visual and temporal characteristics of an image which cause the image to appear to be three dimensional to a viewer.

Animation quality: When an animated image is presented, the detail of the animated image is decreased in the periphery of view.

Post processing effects quality

Refraction quality

Three dimensional object quality: Polygons shown based on the distance of the object to the virtual camera Other parameters beyond the quality of specific graphic content which could be modified include the content of the graphics presented itself. For instance, if normally a collection of objects would be displayed in the periphery, fewer objects might be displayed in the periphery under foveated rendering conditions discussed herein. In some applications, this may reduce processing requirements if objects and or activity occurring in the periphery would not be sufficiently cognizable to a user under foveated rendering conditions. In these embodiments, content of a certain kind could be removed from peripheral presentation. For example, objects having certain virtual characteristics (i.e., characters in a video game, objects in a video game, an environment in a video game, species of objects in other software applications, etc.), certain geometric characteristics (i.e., shape, size, etc.), certain virtual geographic characteristics (i.e., virtual location), or any other specific characteristics might be displayed or not displayed in peripheral rendering under foveated rendering conditions.

Figure 3A:
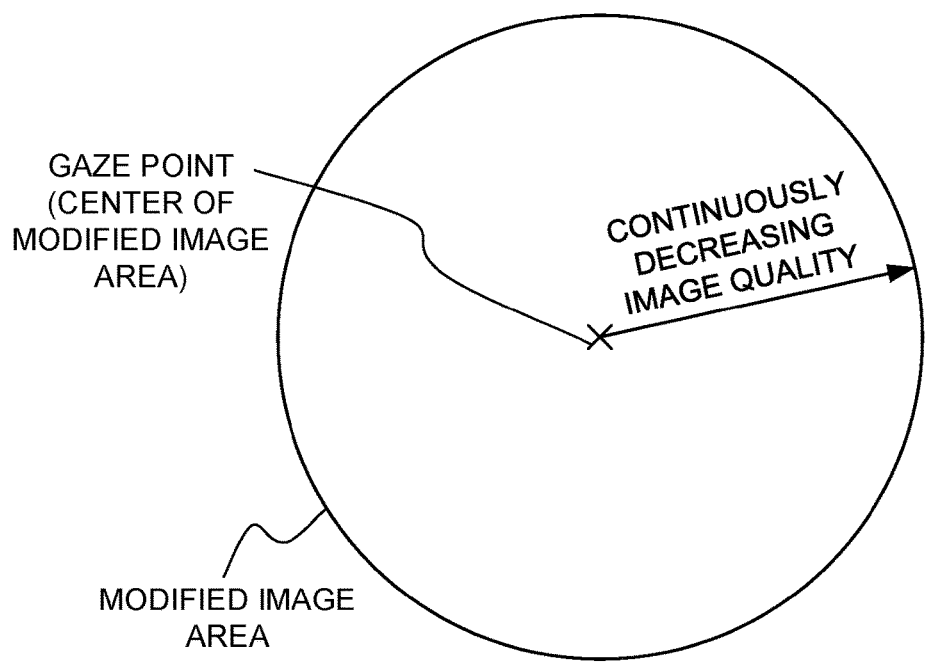
FIG. 3A is a diagram of how image quality may continuously vary within a modified image area.
Figure 3B:
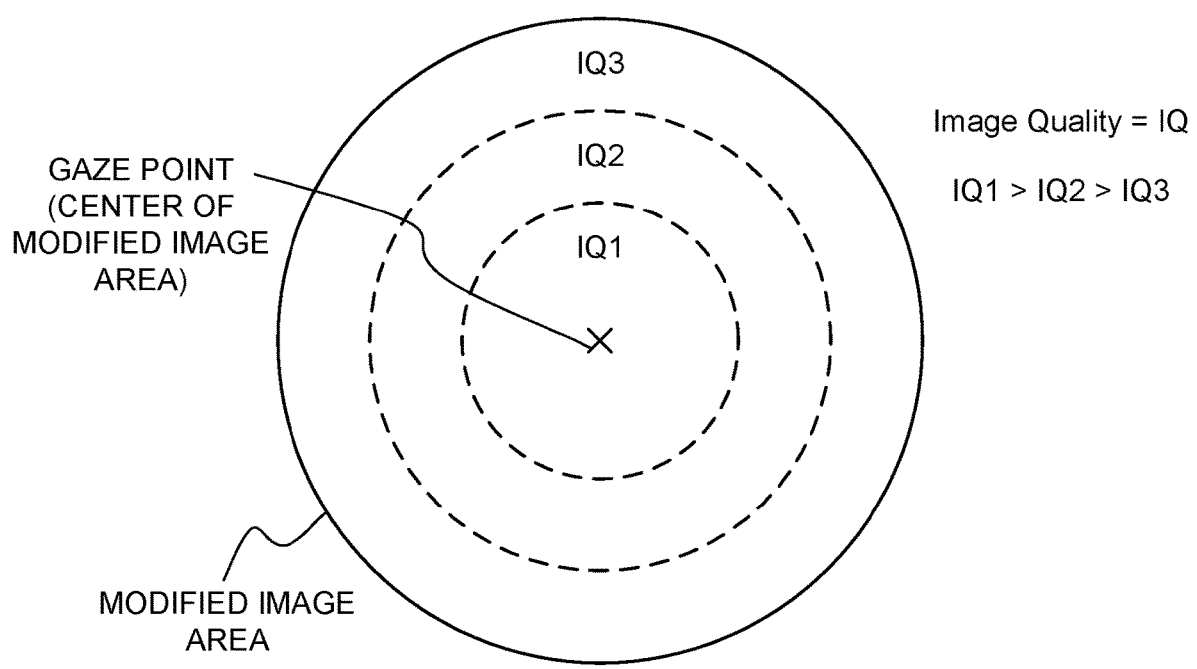
FIG. 3B is a diagram of how image quality may vary in steps within a modified image area.

The size and shape of the area of the image which may be modified to appear in greater quality can vary depending on the embodiment. Merely by way of example, the shape of the area may be circular, oval, square, rectangular, or polygonal. In some embodiments, the quality of the image within the area may be uniformly increased. In other embodiments, the increase in quality of the image may be greatest at the center of the area (i.e., proximate to the gaze point), and decrease towards the edges of the area (i.e., distal to the gaze point), perhaps to match the quality of the image surrounding the area. To demonstrate, FIG. 3A shows how image quality may decrease in a linear or non-liner continuous manner from the center of a gaze area outward, while FIG. 3B shows how image quality may decrease in a stepped manner from the center of a gaze area outward.

In some embodiments, modifying the image displayed on display device 110 may occur in response to the detection of a change in the gaze point. This may occur in a number of fashions, some of which are described below.

In some embodiments, an entirety of the image may be modified during the period of change in the gaze point of the user, and once the change in the gaze point of the user ceases, either the area around end gaze point of the user or a remainder of the image (portions of the image not around the end gaze point) may be modified. Merely by way of example, in one embodiment, the quality of the entire image may be increased during movement of the user's gaze (sometimes referred to as a saccade), but the increase in quality may only be sustained in an area around the user's end gaze point once the saccade is complete (i.e., the quality of the remainder of the image may be decreased upon completion of the saccade). In a different embodiment, the quality of the entire image may be decreased during a saccade, but the decrease in quality may only be sustained areas besides around the user's end gaze point once the saccade is complete (i.e., the quality of the area of the image around the user's end gaze point may be increased upon completion of the saccade).

Additionally, the use of other system resources, including for example processor/computer 140 and related resources, may also be modified during a user's saccade. For example, non-graphical operations may be supplemented by the resources of processor/computer 140 and graphics processing device 130, during a saccade. More specifically, during a saccade, non-graphical calculations necessary for other system operations may proceed at greater speed or efficiency because additional resources associated with processor/computer 140 and graphics processing device 130 are made available for such operations.

In some embodiments, modifying the image displayed on display device 110 may include modifying a portion of the image in an area around an anticipated gaze point of the user, potentially by increasing the quality thereof. The anticipated gaze point may be determined based on the change in the gaze point of the user. To determine the anticipated gaze point of a user, eye tracking device 120 and/or another processor (i.e., the computer or game consoler's processor), may determine a rate of the change in the gaze point of the user on display device 110, and determine the anticipated gaze point based at least in part on this rate of the change.

The rate of change of the gaze point of the user, also referred to as the velocity or speed of a saccade by the user is directly dependent on the total change in the gaze point of the user (often referred to as the amplitude of the saccade). Thus, as the intended amplitude of a user's saccade increases, so does the speed of the saccade. While the saccade of a human user can be as fast as 900°/second in humans, for saccades of less than or about 60°, the velocity of a saccade is generally linearly and directly dependent on the amplitude of the saccade. For example, a 10° amplitude is associated with a velocity of 300°/second and a 30° amplitude is associated with a velocity of 500°/second. For saccades of greater than 60°, the peak velocity starts to plateau toward the maximum velocity attainable by the eye (900°/second). In response to an unexpected stimulus, a saccade normally takes about 200 milliseconds (ms) to be initiated and then lasts from about 20 to about 200 ms. Based on these relationships between saccade speed and amplitude, embodiments of the invention may determine anticipated gaze points based on saccade velocity. Other predetermined models of mathematical relationships between saccade speed and amplitude may also be employed by various embodiments of the invention to determine an anticipated gaze point.

In some embodiments, the portion of the image modified around the anticipated gaze point may also include the portion of the image around the original gaze point (i.e., the gaze point from which the user's saccade started). While the shape of the portion of the image modified may be any of those shapes described above, in some embodiments it may be a triangle or a trapezoidal shape having a progressively greater width perpendicular to a direction of the saccade as shown in FIG. 4.

Figure 4:
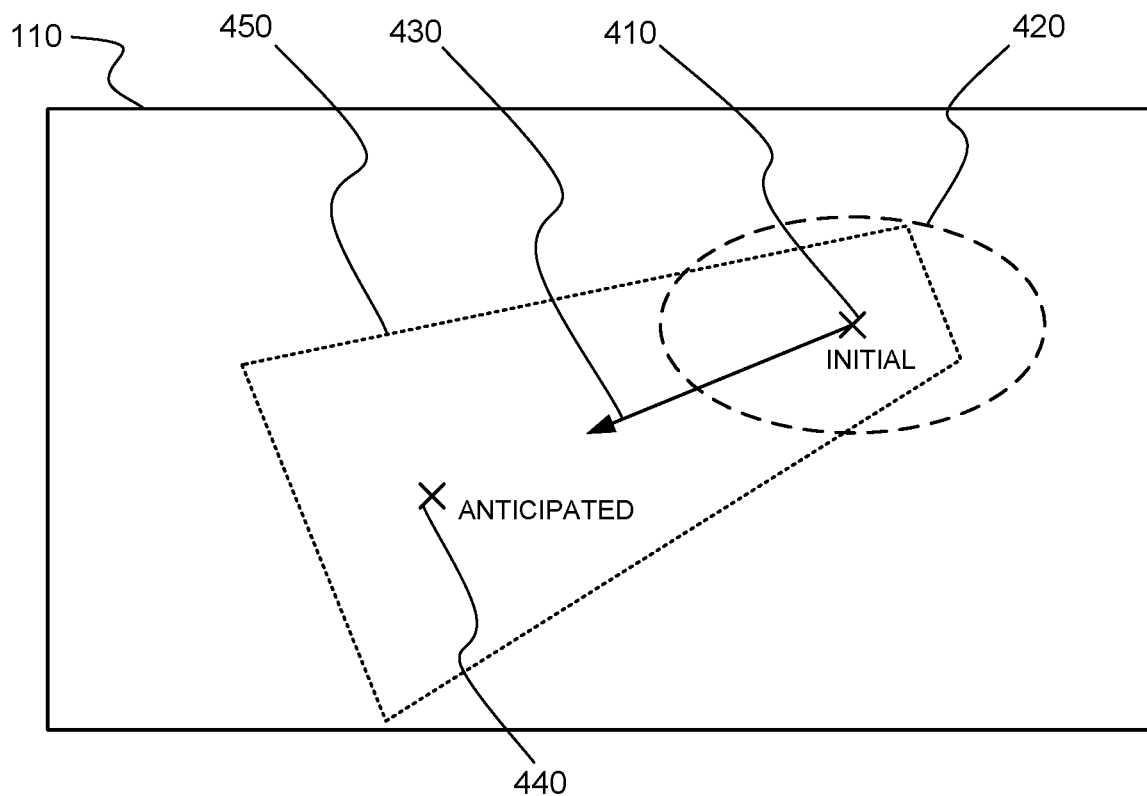
FIG. 4 is a view of a display device of the invention in which image modification is occurring in response to a detected change in a user's gaze point.

In FIG. 4, display device 110 is shown, and an initial user gaze point 410 is shown thereon. Prior to any change in initial gaze point 410, embodiments of the invention may provide increased graphics quality in area 420. When a user saccade, represented by arrow 430, is detected by eye tracking device 120, the size and shape of area 420 may change to accommodate both initial gaze point 410 and anticipated gaze point 440. The changed area 450, while being triangular and/or trapezoidal in this embodiment, may be shaped and sized differently in other embodiments. Merely by way of example, an entire side of display device 110 from the initial gaze point to the edges of the display in the direction of the saccade may also be included in changed area 450 to account for more possibilities of where the user's gaze point may end. In other embodiments, a circular, oval, or square changed area 450 may be provided. In yet other embodiments, changed area 450 may include separate and distinct areas around the initial gaze point 410 and anticipated gaze point 440.

In some embodiments, the size or shape of the area around the gaze point for which an image is modified (or which remains unmodified from a heightened quality in various embodiments), is dynamic. This may occur based at least in part on any number of factors, including the current location of the gaze point relative to the image or display device. Merely by way of example, if a user moves their gaze point to a certain portion of the screen, a predefined portion of the screen may be modified via increased quality therein (for example, a corner portion of the display having a map of a virtual area in a video game). In some embodiments, if enough user saccades having one or more predefined characteristics are detected in predefined amount of time, the entirety of the display may be modified to be rendered in greater quality.

The performance of a computing system may be directly influenced by the consumption of resources the system has at its disposal. These resources include, but are not limited to, processing power, memory size, memory access speed, and computer bus speed. The display of information such as images and other graphical items may directly require the use of such resources. The higher the quality of this information, as has been previously described, the greater the amount of resources required, or the greater level of strain on existing resources. The present invention seeks to decrease the consumption of these resources by allocating graphical processing and execution resources first and primarily to areas of display device 110 that can be readily perceived in high definition by a user, as the areas in which high definition information is actually displayed. Other areas of the display device, which will not be, or cannot easily be, perceived in high definition by a user may be allocated a lesser or remaining amount of resources. Due to latency between the output of information to display device 110 and the speed at which a user can move their eyes and perceive information, it may be desirable to provide a system in which the user does not perceive that there is any change to the quality or definition of information being displayed on the display device 110.

Figure 7A:
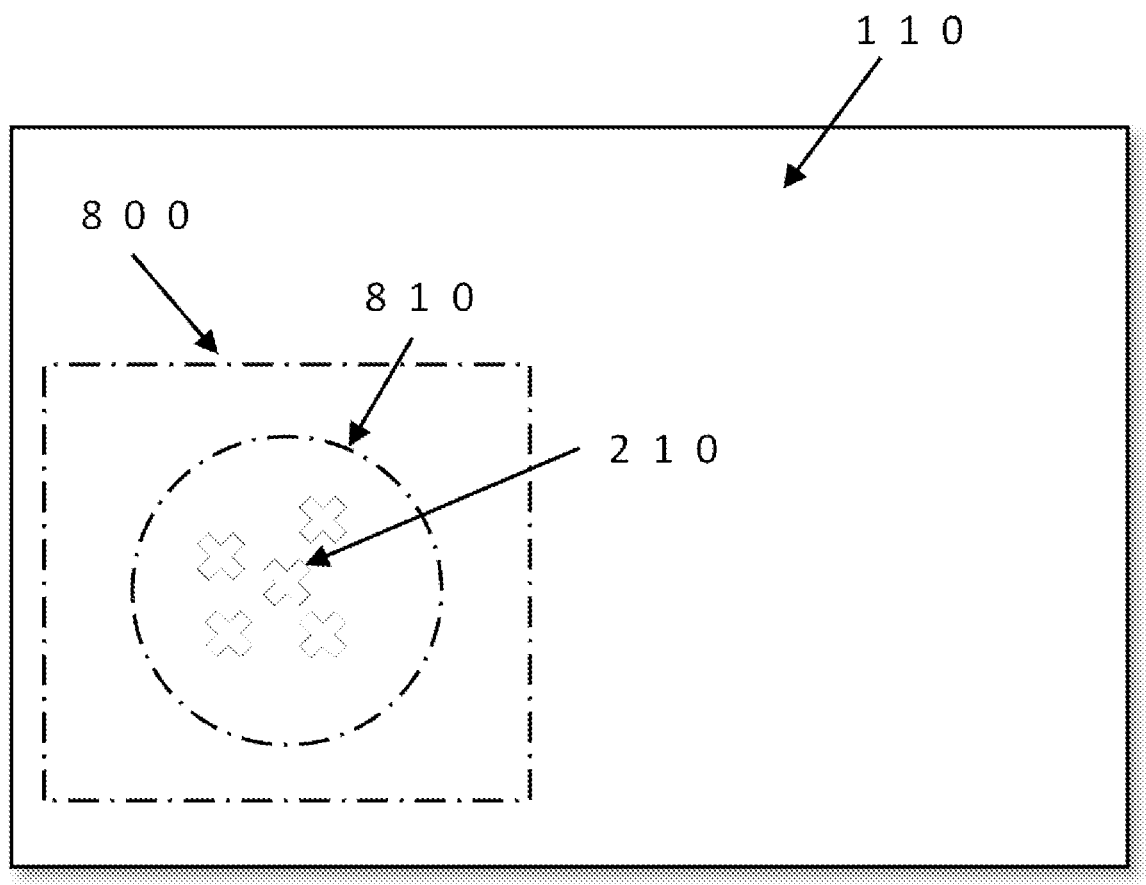
FIGS. 7A and 7B are diagrams showing a change in the location of an area on a display device according to the change in a user's gaze point.
Figure 7B:
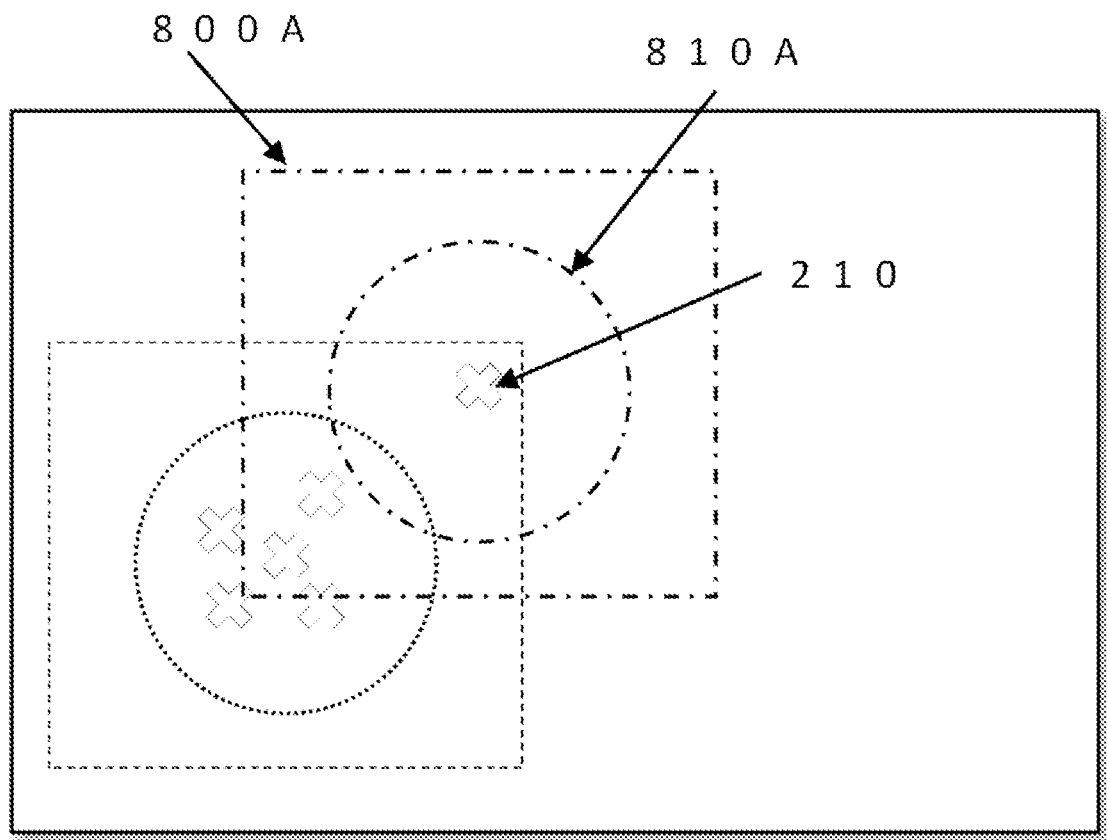

In some embodiments, the gaze point information may be determined by, or based on information from, eye tracking device 120, and may be filtered to minimize the change in areas around the gaze point for which an image may be modified. Referring to FIG. 7A the embodiment includes display device 110 comprising an area 800 containing a sub-area 810. An objective of this and other embodiments may be to maintain high definition and/or other improved graphical rendering qualities in sub-area 810 and/or area 800 around any determined gaze points 210. An image may thus be modified in area 800 such that it contains greater quality graphics or other modified parameters as previously described. If it is determined that a gaze point 210 remains within sub-area 810, the quality of the graphics or the like in area 800 may be modified such that the graphical quality of the images in area 800 are displayed at a higher quality or the like than images outside of area 800 on display device 110. If it is determined that the gaze point is located outside of sub-area 810, as shown in FIG. 7B, a new area 800A is defined containing a new sub-area 810A. New area 800A may then be modified to contain higher quality graphics or other parameters. The invention then repeats, in that if it is determined that the gaze point remains within new sub-area 810A, area 800A remains constant, however if the gaze point is detected outside of new sub-area 810A, area 800A is redefined.

In these or other embodiments, filtering of gaze information may performed to ensure that relocation of area 800 is necessary. For example, the system may determine a gaze point 210 is located outside the sub-area 810 however it may perform no action (such as relocating the area 800) until a predetermined number of gaze points 210 are located outside the sub-area (for example 2, 5, 10, 50). Alternatively, the system could temporarily enlarge area 800 until it is certain the gaze point 210 is located within a certain area. Additionally, predefined time periods may be established to determine if gaze points 210 have moved outside of sub-area 810 for at least those time periods prior to enlarging or changing area 800.

As described herein, when the amount of noise in a gaze point determination is low, and gaze points 210 are located close together, then area 800 and/or sub-area 810 may be smaller, and closely correlated to the actual size of the field of gaze points 210. Conversely, if the amount of noise in a gaze point determination is high, and gaze points 210 are dispersed and/or not located close together, then area 800 and sub-area 810 may be larger. Noise may include, merely by way of example, (1) errors or differences between (a) the calculated/determined gaze point location and (b) the actual gaze point location, as well as (2) drift of the user's actual gaze point even when the user's attention is actually directed toward a particular point on the display device 110. Thus, when noise in a set of gaze point determinations is low, there may be high precision in the gaze point determination, and when noise in a set of gaze point determinations is high, there may be low precision in the gaze point determination.

In some embodiments, a number of different factors can affect the amount of noise in the gaze point 210 determinations. Consequently, the amount of noise in gaze point 210 determinations can affect the size of area 800 and/or sub-area 810. Noise in gaze point 210 determinations can be software and/or hardware based, resulting from inaccuracies in determining the actual gaze point of the user consistently, and/or can be user-based, resulting from drift of the user's gaze from an actual point of interest that the user is consciously focusing on. In either or both cases, multiple and/or continuous gaze point 210 determinations will result in a pattern of gaze points 210 as shown in FIGS. 7A and 7B.

Rather than attempting to determine which of the determined gaze points 210 is the actual gaze point 210 of the user, instead, as described above, area 800 and/or sub-area 810 may be sized to contain all determined gaze points, or a large sub-total thereof (i.e., perhaps excluding certain extreme outliers using statistical and/or error checking routines such as a standard deviation method, Z-score, and/or other methods known in the art). Because certain conditions or "secondary factors" may be known before even a first gaze point 210 is determined, or after only a minimal number of gaze points 210 have been determined, it may be possible to at least initially, if not continually, size area 800 and/or area 810 based on a number of secondary factors, thereby allowing for rendering of area 800 and sub-area 810 immediately around the first (or first few) determined gaze point(s) 210, without the need to obtain additional gaze point 210 data.

Some secondary factors or conditions which may inform an initial or continuing determination as to the size of area 800 and/or sub-area 810 may include (1) which user is viewing the display, (2) environmental factors, (3) content of display device 110, and (4) where on display device 110 the user is gazing.

If the gaze determination system 100 is informed of which user is using system 100, then that user may have a previously determined amount of noise in their gaze data. Different users may have inherently different and/or distinct noise levels due to the particular characteristics of how their gaze wanders on display device 110. From prior usage of system 100, it may thus be known what size of area 800 and/or area 810 will be sufficient for areas of increased graphical quality, without requiring analysis of initial, or additional, gaze point 210 determinations.

Characteristics from the user's body, face, and/or eyes, as detected by the eye tracking device imaging sensors or other sensors, may also inform system 100 of likely characteristics of the user's gaze, and therefore also be used to anticipate the necessary size of area 800 and/or sub-area 810. For example, slumped shoulders and/or squinted eyes may indicate the user is tired (or in some other state), and therefore inform system 100 that area 800 and sub-area 810 should be adjusted accordingly (i.e., made smaller or larger).

Furthermore, the pairing of the user with system 100 may also be relevant to the determination. This meaning that the same user operating two different gaze determination systems may have different noise levels in their gaze point 210 determinations. Thus, USER-A using SYSTEM-A may be associated with a first amount of gaze point 210 noise, while the same USER-A using SYSTEM-B may be associated with a second amount of gaze point 210 noise, with each amount of gaze point 210 noise corresponding to a differently sized area 800 and/or sub-area 810. Additionally, the shape of area 800 and/or sub-area 810 may also correspond to different users and/or different user/system pairs.

Environmental factors may also play a part in an initial or continuing determination of the necessary size for area 800 and/or sub-area 810. Merely by way of example, if system 100 determines that the environment around the user is bright, dim, humid, dry, polluted (particulate matter in the air), windy, subject to extreme or unusual temperatures, or oscillating between various states (e.g., there are flashing lights in the area), system 100 may adjust the size of area 800 and sub-area 810 based upon such information. Thus system 100 may be able to anticipate a certain amount of noise in gaze point 210 determination under such conditions, and anticipatorily adjust the size of area 800 and/or sub-area 810. Other environmental characteristics such as time of day may also affect anticipated noise. Perhaps because users are more likely to be tired during morning or evening hours, and have more or less drift associated with their gaze.

The content displayed on display device 110 may also may also inform system 100 as to the likely noise in gaze point 210 determination. Merely by way of example, brighter or darker images displayed on display device 110 may be known to cause more or less noise in gaze determination. In other example, text may make more or less noise likely for a given user. Other examples include the nature of the graphical content. Merely by way of example, dynamic fast moving images may produce more or less noise than static or slow moving images. System 100 may be able to take this into account to anticipate what size area 800 and sub-area 810 are necessary.

Finally, where a user is gazing on the display device 110 may also affect likely noise levels. Merely by way of example, when gaze point 210 of the user is near the boundaries of display device 110, noise may be amplified compared to when the user's gaze point 210 is near the center of display device 110. Noise may also vary less or more greatly depending on whether gaze point 210 is to the left or right of center versus being above or below center of the display.

Figure 9:
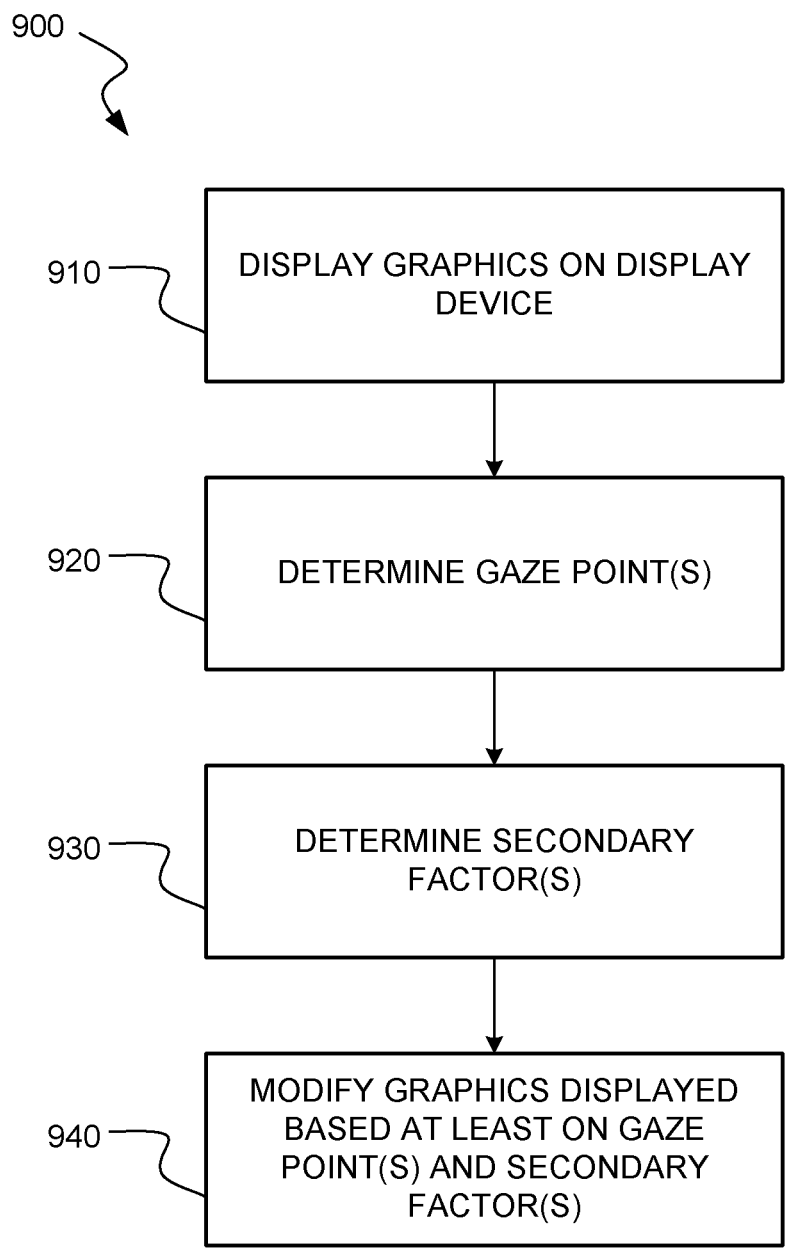
FIG. 9 is a flow diagram of another possible method of the invention for modifying an image based on a user's gaze point and other secondary factors.

Thus, in one embodiment, as shown in FIG. 9, a method of one embodiment of the invention may include, at block 910, displaying graphics on a display device. At block 920, and continually thereafter, one or more gaze points of the user may be determined. At block 930, secondary factors as discussed above may be determined. At block 940, the graphics displayed may be modified based at least on the determined gaze point(s) and the determined secondary factor(s).

Figure 10:
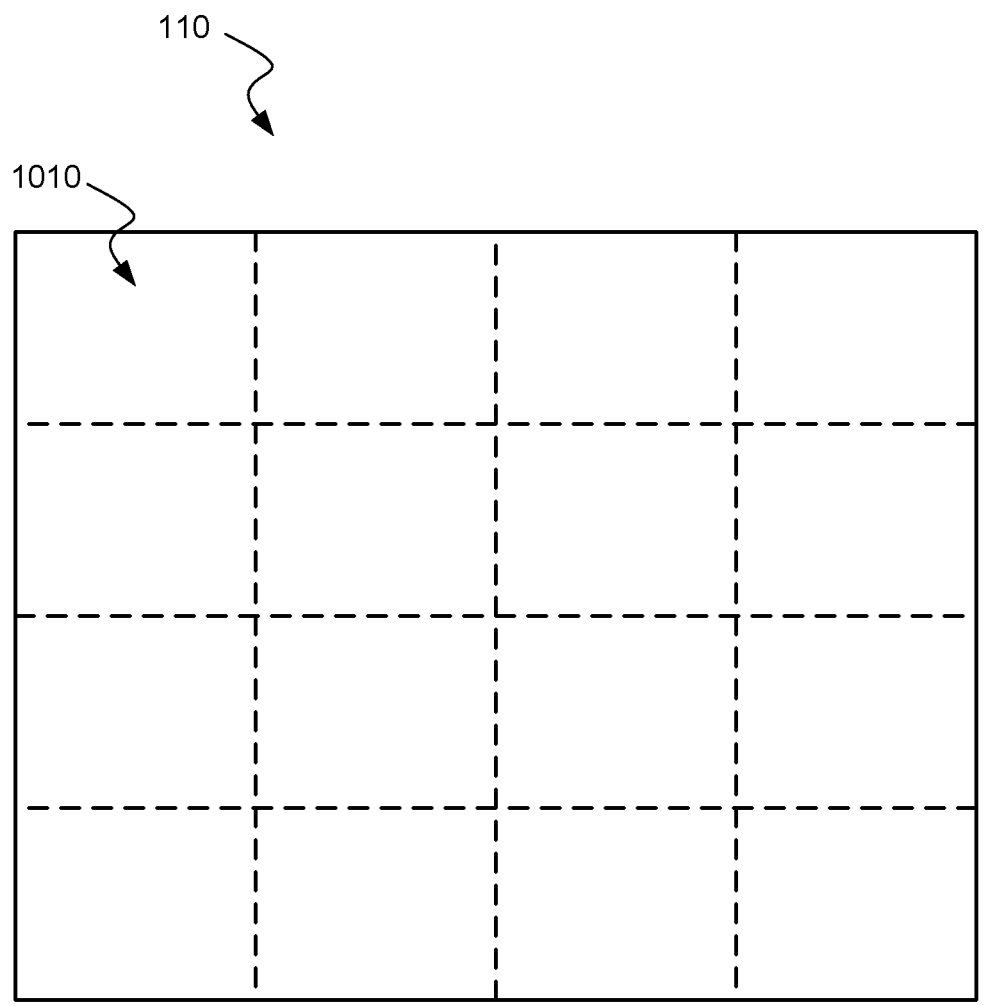
FIG. 10 is a display screen showing one embodiment of the invention where different regions may be rendered in varying quality based at least on a user's gaze point.

In some embodiments, another method of determining the size of area 800 and/or sub-area-810 may be to employ predefined regions on display device 110 which would dictate the size and/or shape of area 800 and/or sub-area 810. Thus, display device 110 may be divided into a plurality of predefined regions within the display area. For example, as shown in FIG. 10, display device 110 may be divided into sixteen predefined regions 1010. Predefined regions 1010 may be fixed by hardware and/or software, or may be manually set by the user before the usage. Different software programs may also be able to predefine regions 1010 based on the particular needs of the software program.

If all of the user's gaze points 210 are located within a particular predefined region 1010, then the particular predefined region 1010 is rendered in a higher quality than compared to the other predefined regions 1010 in which no gaze position is included. In another example, if the gaze positions are located in more than one predefined region 1010, then all predefined regions 1010 in which gaze positions are located are rendered in a higher quality than compared to the other predefined regions 1010 in which no gaze position is included. In other related embodiments, variations in the above examples may be present. Merely by way of example, the predefined regions 1010 may be divided from just a portion of display device 110 instead of the entire display area of display device 110.

Such methods of using predefined regions 1010 for foveated rendering may have particular merit in some virtual and/or augmented reality headsets that are not equipped with especially accurate and/or powerful eye tracking systems.

Low quality eye tracking in such embodiments may exist in some part due to a low maximum frame rate of the eye tracking camera employed. In such situation, the system may only provide a rough determination of gaze positions, which may result in the low precision eye tracking data (i.e., the determined gaze positions are widely spread). In order to provide foveated rendering for such low quality eye tracking situations, we predefined regions 1010 may be employed.

Figure 11:
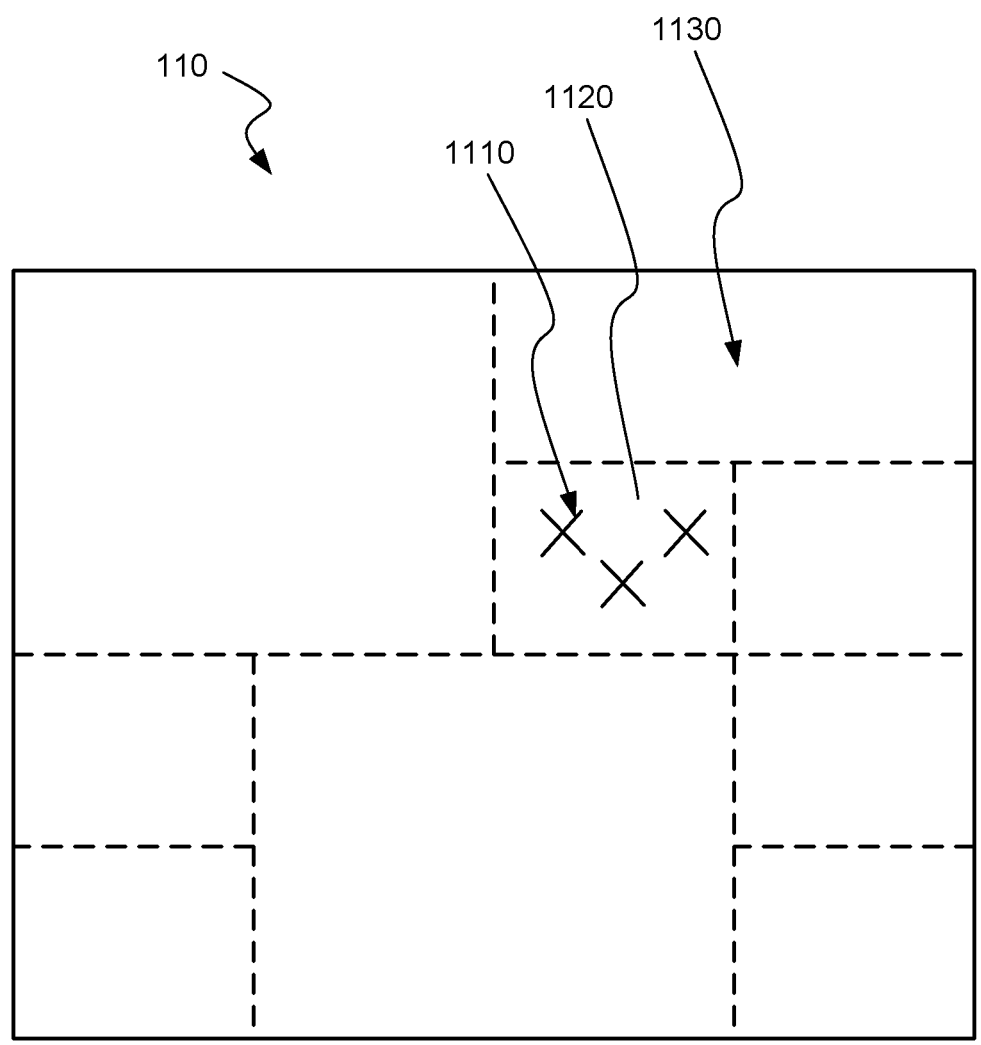
FIG. 11 is a display screen showing another embodiment of the invention where different size and/or shaped regions may be rendered in varying quality based at least on a user's gaze point.

In an alternative embodiment shown in FIG. 11, the method may determine gaze positions 1110 first, and then a high quality region 1120 (size and shape) is determined based on at least a portion (for example, majority) of the gaze positions. A plurality of surrounding regions 1130, surrounding initial high quality region 1120 are then determined based on the determined size and shape of the high quality region 1120. The display quality of those surrounding regions are lower than the determined high quality region 1120. In a special case, each of the surrounding regions 1130 may have differing display quality, depending on various rendering conditions (e.g. displayed object characteristics, displayed object positioning, distance to the high quality region 1120, etc.).

In another possible embodiment, if a sub-area 810 represents a certain zone where the gaze point 210 of the user is located, and to which a first degree of increased rendering quality is applied, surrounding zones to may be represented by area 800 to which a second degree of increased rendering quality is applied (the second degree being less significant than the first degree).

Figure 8:
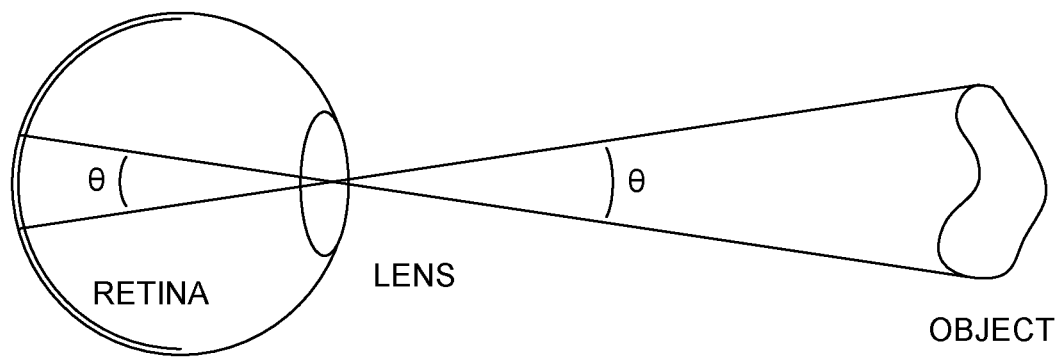
FIG. 8 is a diagram demonstrating an eccentricity angle.

In some embodiments, the size of area 810 may be based on an eccentricity angle of about 1-5 degrees from the currently determined gaze point. In exemplary embodiments, the angle may be about 3 degrees. Although the concept of an eccentricity angle would be well understood by a person of skill in the art, for demonstration purposes, its use in the present embodiment will now be described with reference to FIG. 8.

The eccentricity angle $\theta$ represents a person's fovea vision. In some embodiments, it may be preferable that area 800 is larger than the area labeled "object" in FIG. 8. This means that there may be a high probability that while a person's gaze point 210 remains within the sub-area 810, that person will not be able to perceive information outside the area 800 at high quality. The size of the area labeled "object" on display device 110 is primarily dependent on the physical size of display device 110 and the distance between the eye(s) and display device 110.

The size of area 800 may be modified to affect performance, as the greater the size of area 800, the more system resources are required to render graphics at higher quality. By way of example, the area 800 may be of such size so as to fit within the display 2 to 12 times. This size may be optionally linked directly to the size of display device 110, or to the eccentricity angle, such that the size may scale efficiently. In a further embodiment, gaze point 210 may be determined after adjusting information obtained by eye tracking device 120 to remove noise. Different individuals may have different levels of noise in the gaze information obtained by eye tracking device 120 (for example, due to wandering of their eye(s) about the gaze point). If an individual has a low level of noise, area 800 may be smaller, and thus performance of the system on which the present embodiment is being practiced may be increased.

In another embodiment of the invention, a non-transitory computer readable medium having instructions thereon for presenting graphics on display device 110 is provided. The instructions may be executable by one or more processors to at least display an image on display device 110. The instructions may also be executable to receive information from eye tracking device 120 indicative of at least one of a gaze point of a user on display device 110, or a change in the gaze point of the user on display device 110. The instructions may further be executable to cause graphics processing device 130 to modify the image displayed on display device 110 based at least in part on the gaze point of the user on display device 110, or the change in the gaze point of the user on display device 110. Thus, a non-transitory computer readable medium able to implement any of the features described herein in relation to other embodiments is also provided.

Figure 5:
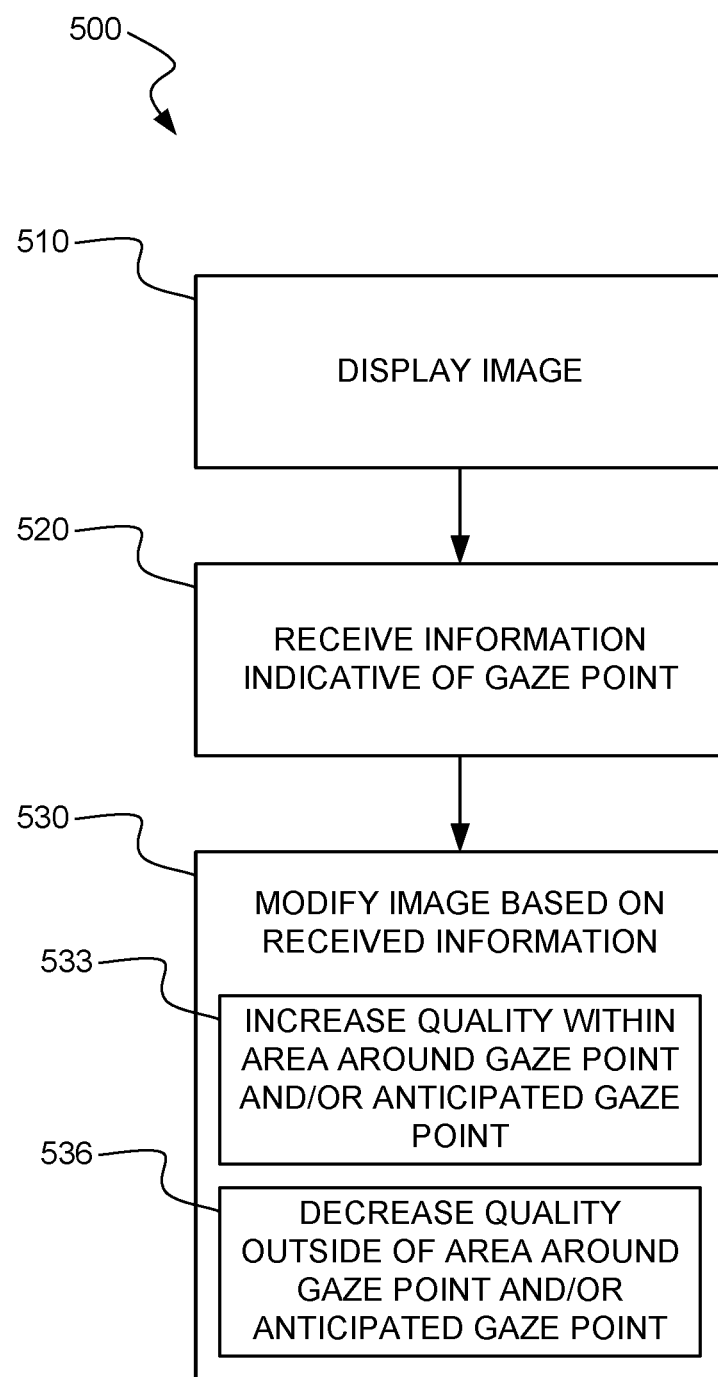
FIG. 5 is flow diagram of one possible method of the invention for modifying an image based on a user's gaze point.

In another embodiment of the invention, a method 500 for presenting graphics on display device 110 is provided as shown in FIG. 5. At step 510, method 500 may include displaying an image on display device 110. At step 520, method 500 may also include receiving information from eye tracking device 120 indicative of at least one of a gaze point of a user on display device 110, or a change in the gaze point of the user on display device 110. At step 530, method 500 may further include causing graphics processing device 130 to modify the image displayed on display device 110 based at least in part on the gaze point of the user on display device 110, or the change in the gaze point of the user on display device 110. Step 530 may include, at step 533, increasing the quality of the image in an area around the gaze point of the user, relative to outside the area. Step 530 may also include, at step 536, decreasing the quality of the image outside an area around the gaze point of the user, relative to inside the area. Thus, a method to implement any of the features described herein in relation to other embodiments is also provided.

In some embodiments, the systems and methods described herein may be toggled on and off by a user, possibly to account for multiple additional viewers of display device 110 being present. In other embodiments, the systems and methods described herein may automatically toggle on when only one user is viewing display device 110 (as detected by eye tracking device 120), and off when more than one user is viewing display device 110 (as detected by eye tracking device 120). Additionally, in some embodiments, the systems and methods described herein may allow for reduction in rendering quality of an entire display device 110 when no viewers are detected, thereby saving system resources and power consumption when display device 110 is not the primary focus of any viewer.

In other embodiments, the systems and methods described herein may allow for modifying multiple portions of an image on display device 110 to account for multiple viewers as detected by eye tracking device 120. For example, if two different users are focused on different portions of display device 110, the two different areas of the image focused on may be rendered in higher quality to provide enhanced viewing for each viewer.

In yet other embodiments, data associated with an image may inform the systems and methods described herein to allow prediction of which areas of an image may likely be focused on next by the user. This data may supplement data provided by eye tracking device 120 to allow for quicker and more fluid adjustment of the quality of the image in areas likely to be focused on by a user. For example, during viewing of a sporting event, a picture-in-picture of an interview with a coach or player may be presented in a corner of the image. Metadata associated with the image feed may inform the systems and methods described herein of the likely importance, and hence viewer interest and likely focus, in the sub-portion of the image.

Figure 6:
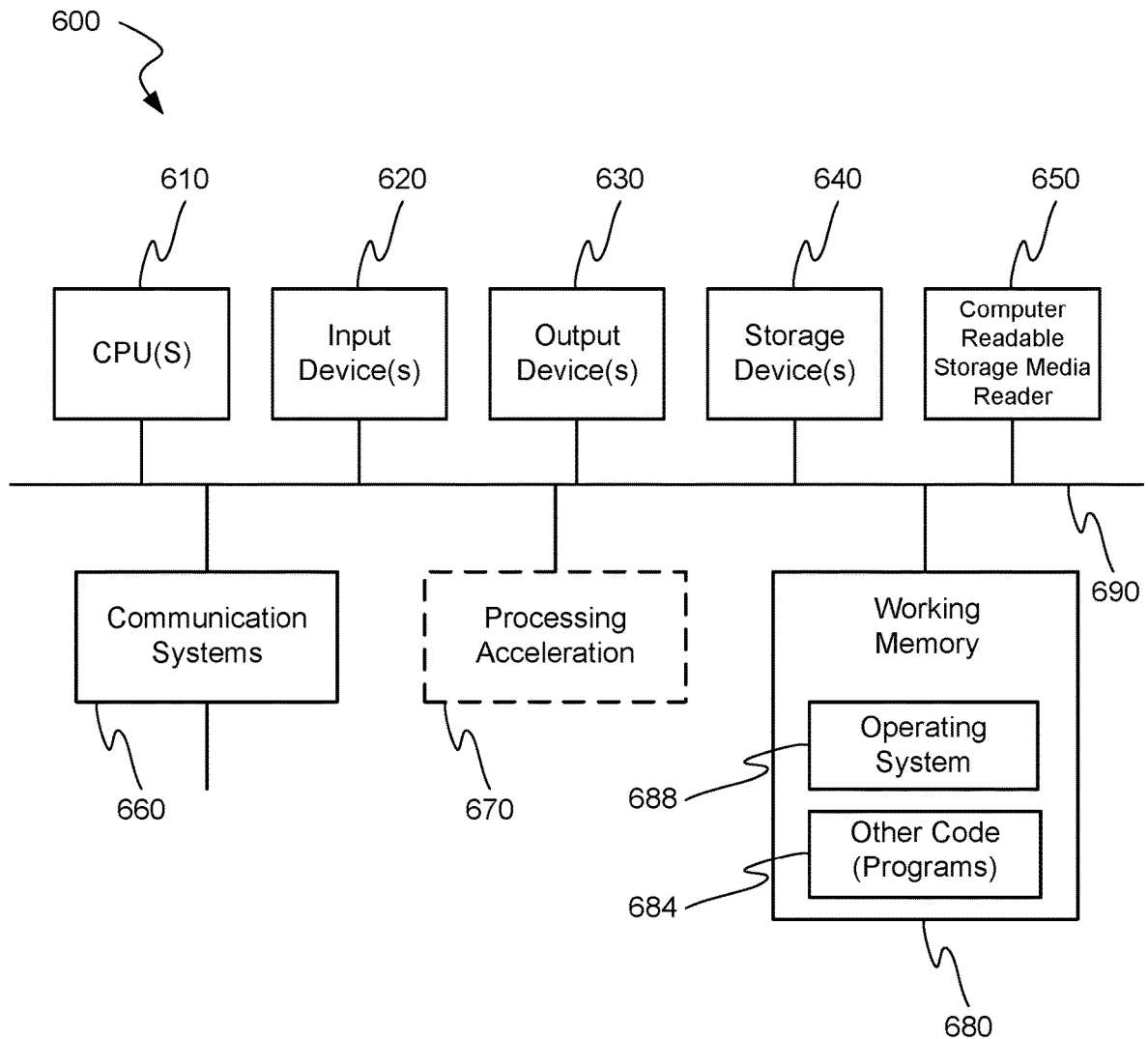
FIG. 6 is a block diagram of an exemplary computer system capable of being used in at least some portion of the devices or systems of the present invention, or implementing at least some portion of the methods of the present invention.

FIG. 6 is a block diagram illustrating an exemplary computer system 600 in which embodiments of the present invention may be implemented. This example illustrates a computer system 600 such as may be used, in whole, in part, or with various modifications, to provide the functions of eye tracking device 120, graphics processing device 130, the game console, the processor/computer 140, and/or other components of the invention such as those discussed above. For example, various functions of eye tracking device 120 and associated processors may be controlled by the computer system 600, including, merely by way of example, tracking a user's gaze point, determining an anticipated gaze point, controlling graphics processing device 130, etc.

The computer system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). The computer system 600 may also include one or more storage device 640. By way of example, storage device(s) 640 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, the computer system 600 may also include a processing acceleration unit 670, which can include a digital signal processor, a special-purpose processor and/or the like.

The computer-readable storage media reader 650 can further be connected to a computer-readable storage medium, together (and, optionally, in combination with storage device(s) 640) comprehensively representing remote, local, fixed, and/or removable storage devices plus storage media for temporarily and/or more permanently containing computer-readable information. The communications system 660 may permit data to be exchanged with a network, system, computer and/or other component described above.

The computer system 600 may also comprise software elements, shown as being currently located within a working memory 680, including an operating system 684 and/or other code 688. It should be appreciated that alternate embodiments of a computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 600 may include code 688 for implementing any or all of the function of the various elements of the architecture as described herein. For example, software, stored on and/or executed by a computer system such as system 600, can provide the functions of eye tracking device 120, graphics processing device 130, the game console, the processor/computer, and/or other components of the invention such as those discussed above. Methods implementable by software on some of these components have been discussed above in more detail.

Figure 12:
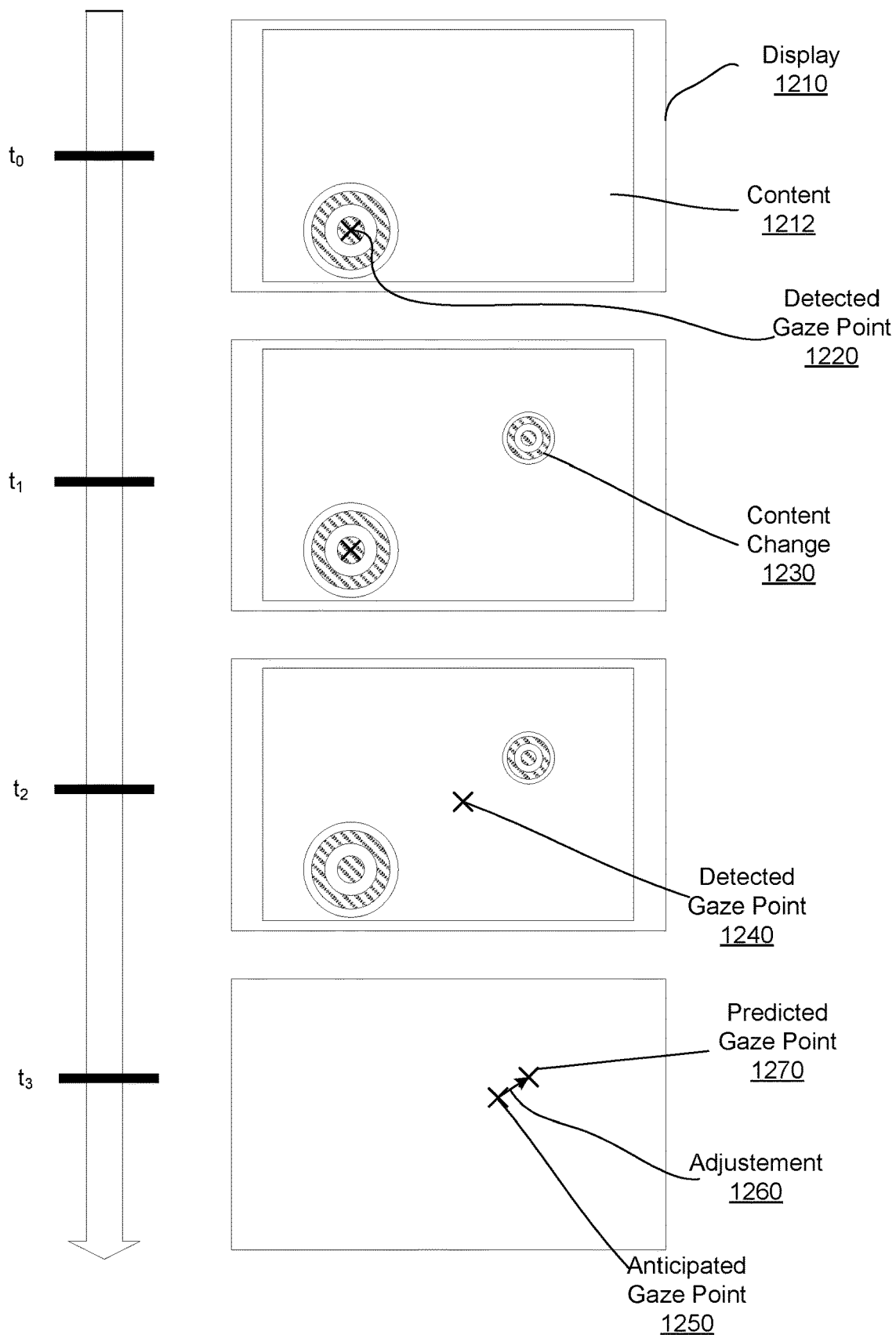
FIG. 12 is an illustration of an example for adjusting a gaze prediction based on content change over time.

FIG. 12 is an illustration of an example for adjusting a gaze prediction based on content change over time. Generally, detection of an actual gaze point may result in certain processing latency. This processing latency may be too large or impact the quality of certain gaze-based applications, such as foveated rendering. To alleviate the processing latency, gaze prediction may be used to predict where a gaze may land as a point in space. Common techniques for anticipating the landing point include ballistic prediction based on saccade data. Typically, the ballistic prediction attempts to anticipate the saccade landing taking into account velocity, acceleration, and/or other data related to the saccade.

The accuracy of such common prediction techniques may be further improved with a light processing cost. Embodiments herein describe determining a change in content presented on a display. Based on the direction and/or proximity of the change to the saccade and/or the anticipated landing point, the prediction is adjusted such that the gaze point is predicted to be close or within an area of the content change on the display.

For example, an eye tracking system may record a first image at a first point in time, and a second image at a second point in time. Each of the images may correspond to a frame presented on the display. Upon detecting a saccade, the eye tracking system may access and compare first and second images to find an area with large discrepancy between the two images. This large discrepancy indicates a content change that likely attracted the user's attention. The eye tracking system can then predict that the saccade will land within the area.

Hence, a very light-weight investigation of presented content can be used to refine the results of a ballistic prediction. This investigation relies on the assumption that a "targeting saccade" occurs when an object suddenly appears in the peripheral view. During rendering, a very small screen space history of rendering output (e.g., RGB color and/or luminosity at less than 1% of the full screen resolution (or some other percentage)) is recorded. When a saccade is detected, this history is checked along the general direction of the saccade. If a large discrepancy in the rendering is detected, an assumption can be made that an object either disappeared or appeared at this location. If the location is on or close to the ballistic path, the prediction of the landing point can be nudged towards it, thereby refining the accuracy of the prediction. This approach has a minimal processing and memory cost. Due to the time it takes from the start of the saccade (caused by a significant visual change in the periphery) to the end (landing), the processing latency for refining the ballistic prediction can be very well tolerated.

As illustrated in FIG. 12, a user views content 1212 presented on a display 1210 associated with an eye tracking system. The content 1212 is presented in frames (e.g., twenty-four frames per second) at a particular image resolution (e.g., such as a pixel density of 1080p or some other resolution). For instance, the content 1212 includes shooting targets from a video game, where the user aims at such targets by gazing on the display 1210. At time a point in time (shown as time "$t_0$"), the eye tracking system detects the user gaze on a particular portion of the display 1210. For instance, the content 1212 may show a shooting target on the left bottom corner. The user may be fixated on the corresponding portion on the display 1210, as illustrated with the detected gaze point 1220.

At a subsequent point in time (shown as time "$t_1$"), a change 1230 in the content 1212 may occur. For example, a new shooting target may flash onto the top right corner, challenging the user to re-aim. If the content change 1230 is sudden and large enough (e.g., in color luminosity, and/or size on the display 1210), it may represent an unexpected stimulus. Accordingly, the user may be attracted to it and a saccade may occur by which the user's eyes rapidly move to view the content change 1230. However, and as described herein above in connection with FIG. 5, in response to an unexpected stimulus, a saccade normally takes about 200 ms to be initiated. Hence, at the point in time "$t_1$," the saccade may not have started yet. Instead, at a next point in time (shown as time "$t_2$"), within 200 ms or so from "$t_1$," the saccade may start and may be detected by the eye tracking system.

FIG. 12 illustrates the saccade detection as additionally detecting a second gaze point 1240, shown as being directed to the content change 1230, and representing a rapid movement of the eye(s) (e.g., at a speed larger than a threshold). Generally, the saccade data includes at least two gaze points on the display 1210, consecutive in time and each at a known time (e.g., the first detected gaze point 1220 and the second detected gaze point 1240), where the speed of the gaze between the at least two gaze points is larger than the threshold.

Before the content 1212 is further presented at a subsequent time "$t_3$," the eye tracking system may rely on a ballistic prediction technique to predict, based on the saccade data, a landing point of the saccade, shown as an anticipated gaze point 1250. The eye tracking system may also rely on the content change 1230 to determine the area on the display that contains this change 1230. Based on the relative proximity and/or direction between this area and the saccade or the anticipated gaze point 1250, the eye tracking system may perform an adjustment 1260 on the anticipated gaze point 1250 to refine the ballistic prediction, whereby this point 1250 may be moved to fall within the area. The adjustment 1260 can include updating the location and/or direction of the landing point. FIG. 12 shows the adjusted landing point of the saccade as a predicted gaze point 1270. Further details about determining the area and performing the adjustment 1260 are further described in connection with the next figures.

When the content 1212 is presented at point in time "$t_3$," that content 1212 can be adjusted given the predicted gaze point 1270. For example, if foveated rendering is used, the portion of the content 1212 surrounding the predicted gaze point 1270 can be presented at a higher image resolution that a remaining portion of the content 1212.

To support the refinement of the ballistic prediction, images of the content can be recorded in storage (e.g., permanent or temporary storage) accessible to the eye tracking system. The storage may be local to the eye track system, or remote on a network and available based on a network location. Each image can represent a lower resolution (e.g., one percent, or some other predefined percentage) version of the content at a particular point in time. For instance, and referring to the above example, three images may be recorded, one corresponding to the frame presented at time "$t_0$," one corresponding to the frame presented at time "$t_1$," and one corresponding to the frame time "$t_2$." Of course additional images can be recorded prior to time "$t_0$," at time "$t_3$," and subsequently.

Particularly, when the content 1212 is presented as frames, each image has a lower image resolution than the presented frames of the content. Each image can be a snapshot of a presented frame. All the frames may be snapshotted at the lower resolution, or the snapshotting can occur at frame intervals (e.g., every other frame, every five frames, or some other predefined interval).

To detect the content change 1230, the eye tracking system may access at least two recorded images from the storage for comparison. These images may be selected using different techniques that can use the detection of the saccade as a trigger. In one technique, upon the detection of the saccade, the selection is for the most up to date image recoded in the storage and a preceding image by a certain amount of time (or, similarly, by a certain number of frames), such as by 200 ms (or, similarly, by five frames for a 24 frames/second presentation). In another example technique, a circular memory buffer is used, where its size corresponds to a certain amount of time (e.g., 220 ms) or a certain amount of frames (e.g., six frames) sized according to the average user response time to an unexpected stimulus (e.g., ten percent larger than 200 ms). In this example, the most up to date and the oldest images are selected. In yet another example, the timing of the start of the saccade is determined and used to select one of the images. For instance, this selected image corresponds in time to the start of the saccade. In this example, the other selected image(s) can precede and/or follow in time by a predefined amount (or in frames by a predefined amount).

Once selected, the eye tracking system may compare the images to determine the change in the content. In an example, the comparison includes comparing properties of pixels in the images (e.g., at least the first image and the second image that were selected). The properties include RGB color and/or luminosity. In another example, the comparison includes determining pixels that have changed and the size of the corresponding location. In particular, the eye tracking system may determine the subset of the pixels where the change is detected. This subset represents the location of the content change 1230, where this location can correspond to a sub-area on the display 1210. If the change in the content between the images (e.g., in pixel properties or location size) is larger than a content change threshold, the eye tracking system may determine that the content change is significant to represent an unexpected stimulus capable of attracting the user's attention. In this case, the adjustment 1260 can relocate the landing point to fall within, on the edge, or proximate to this sub-area on the display 1210 (e.g., within a predefined number of pixels from the edge of the sub-area).

In an example, the content change threshold used to determine whether the content change is significant or not can be predefined. In another example, this threshold is dynamically defined based on the saccade. For instance, a time difference between the content change 1230 and the start time of the user saccade data is measured. The smaller the time difference is, the faster the user attraction likely was and, thus, the more significant the content change likely is. Accordingly, the content change threshold can be set as a function of this time difference, by for instance, increasing this threshold with a decrease of the time difference because of the expected increase to the significance of the content change.

Figure 13:
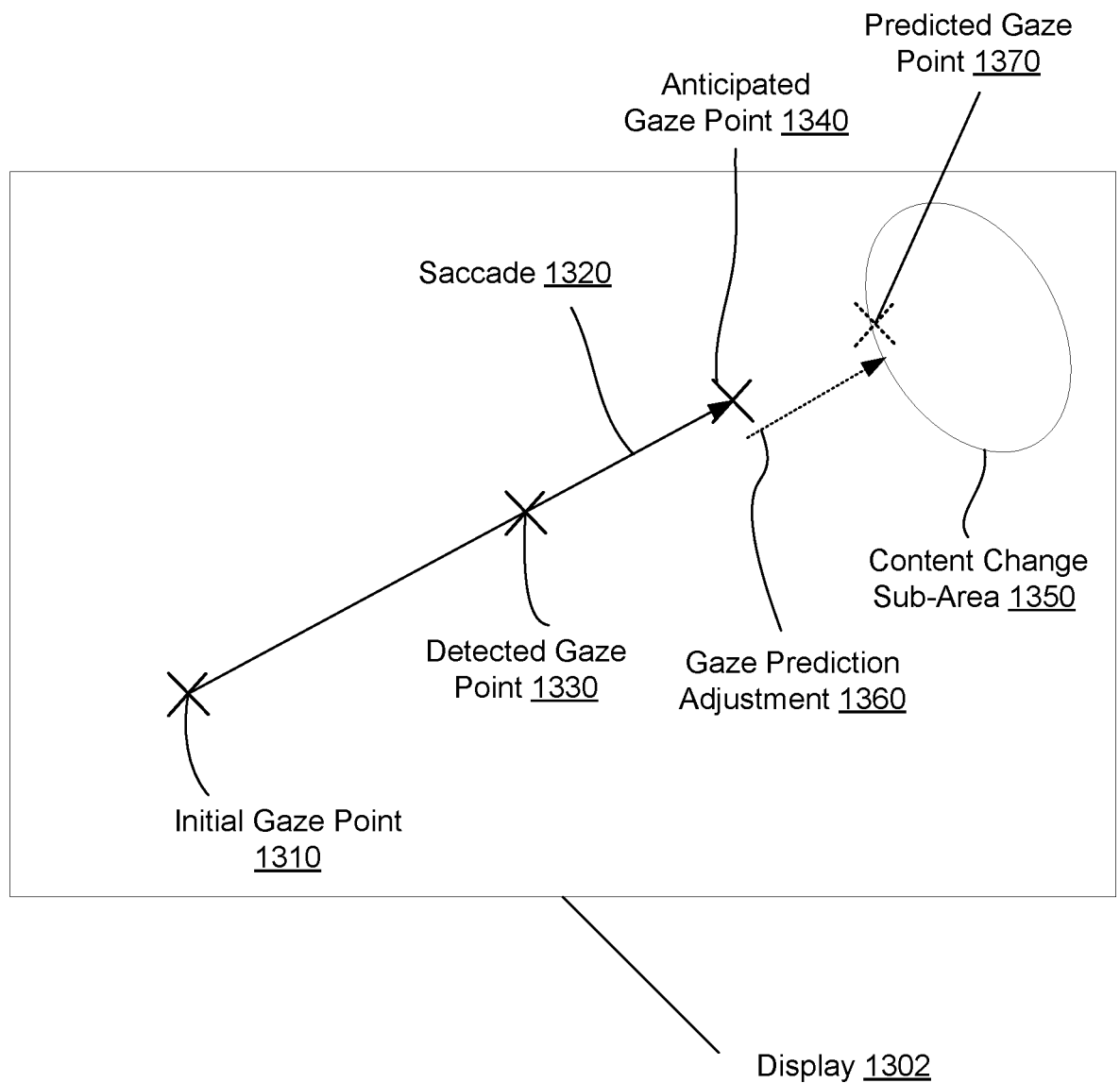
FIG. 13 is an illustration of an example for using saccade data to adjust a gaze prediction based on content change.

FIG. 13 is an illustration of an example for using saccade data to adjust a gaze prediction based on content change. As illustrated, an initial gaze point 1310 of a user is detected on a display 1302. During a saccade 1320 of the user, one or more subsequent gaze points on the display 1302 are detected, including a detected gaze point 1330. The locations and timings of initial gaze point 1310 and the detected gaze point 1330 may be used to define the saccade data, including for example, the speed and direction of the saccade 1320. For instance, the saccade 1320 may be represented as a vector originating at the initial gaze point 1310, in the direction of the detected gaze point 1330 (and any other such gaze points), and having a magnitude depending on the speed and/or acceleration, where the speed and/or acceleration are functions of the timings.

In an example, a ballistic prediction uses the saccade data to predict a landing point, shown as an anticipated gaze point 1340. As explained herein above, based on change in the content presented on the display 1302, a sub-area 1350 on the display 1302 and corresponding to this content change is determined. Based on a comparison between the sub-area 1350 and the saccade 1320 and/or the anticipated gaze point 1340, a gaze prediction adjustment 1360 is made to refine the prediction, thereby resulting in a predicted gaze point 1370. Examples of the comparison are further described in connection with the next figures. Generally, the comparison can rely on direction and/or proximity between the sub-area 1350 and the saccade 1320 and/or the anticipated gaze point 1340. Different types of the adjustment 1360 are possible. Generally, the adjustment 1360 includes setting the predicted gaze point 1370 to be within, on the edge, or proximate to the sub-area 1350.

In an illustration, the adjustment 1360 sets the predicted gaze point 1370 as a point within the sub-area 1350. This point 1370 can be predefined. For instance, the predicted gaze point 1370 can be set at the center of the sub-area 1350. Alternatively, the predicted gaze point 1370 can be set based on the landing point (e.g., the anticipated gaze point 1340) and/or the saccade 1320. For instance, this point 1370 is set to be the closest one within the sub-area 1350 to the anticipated gaze point 1340. In another illustration, the larger the speed of the saccade 1320, the further away this point is from the gaze point 1340.

In another illustration, the adjustment 1360 can also rely on weights applicable to the estimation of the saccade 1320 and the content change. In particular, a first weight may be defined for the saccade 1320 and a second weight may be defined for the content change. The first weight can be increased with an increase to the confidence in the saccade estimation. The second weight can be increased with an increase to the amount of the content change, where this amount can correspond to the pixel property change and/or size of the sub-area 1350 as described herein above in connection with FIG. 12. The adjustment 1360 can be a function of both weights, where the higher the first weight is, the closer the predicted gaze point 1370 is to the anticipated gaze point 1340 and/or direction of the saccade 1320. Conversely, the higher the second weight is, the closer the predicted gaze point 1370 is to the content change sub-area 1350.

In another example, a landing point may not be determined or used. Instead, the direction of the saccade 1320 and the sub-area 1350 can be used to determine the predicted gaze point 1370, without relying on the anticipated gaze point 1340. For instance, if sub-area 1350 is in proximity of the direction of the saccade 1320, the predicted gaze point 1370 may be set to be within, on the edge, or proximate to the sub-area 1350.

In an illustration, the predicted gaze point 1370 may be set to be within the sub-area 1350. For instance, based on the sub-area 1350 being proximate to and in the same direction as the saccade 1320, the predicted gaze point 1370 can be set at the center of the sub-area 1350. Alternatively, the predicted gaze point 1370 can be set based on the proximity to the direction of the saccade 1320. For instance, this point 1370 is set to be the closest one within the sub-area 1350 to the direction of the saccade 1320.

In another illustration, setting the predicted gaze point 1370 can also rely on the weights applicable to the estimation of the saccade 1320 and the content change. As explained herein above, a first weight and a second weight may be defined for the saccade 1320 and the content change and adjusted based on the confidence of the saccade estimation and the amount of the content change. The higher the first weight is, the closer the predicted gaze point 1370 is to the direction of the saccade 1320. Conversely, the higher the second weight is, the closer the predicted gaze point 1370 is to the content change sub-area 1350.

Figure 14:
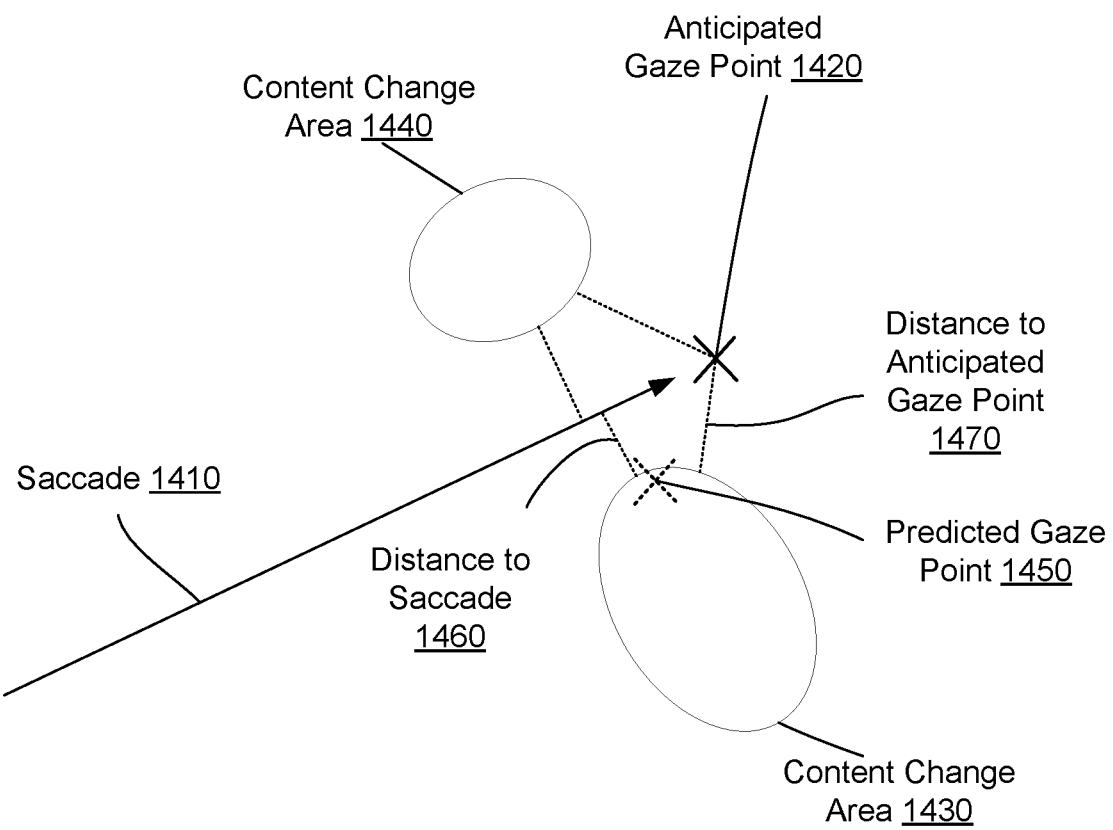
FIG. 14 is an illustration of example factors for adjusting a gaze prediction based on content change.

FIG. 14 is an illustration of example factors for adjusting a gaze prediction based on content change. As illustrated, a saccade 1410 of a user on a display is detected and an anticipated gaze point 1420 corresponding to a ballistic prediction is determined. The saccade detection can be used as a trigger to refine the ballistic prediction by accessing, from storage, recorded images of content presented on the display at different times and determining, based on the image, changes to the content over time. From the image comparison, a determination can be made that the content changed significantly at one or more different locations corresponding to one or more sub-areas of the display. FIG. 14 illustrates two sub-areas 1430 and 1440, although a different number of sub-areas is possible. The eye tracking system may then select one of the sub-areas 1430 or 1440 to adjust the anticipated gaze point 1420, resulting in a predicted gaze point 1450. Each of the sub-areas 1430 and 1440 corresponds to a location of a content change. In particular, the content presented at the display has changed in two locations, each presented at one of the sub-areas 1430 or 1440.

Different factors are possible to select a sub-area corresponding to a location of content change (or, similarly, to a particular change in the content) and, thereby, set the adjusted gaze point 1450. In an example, the proximity to the saccade 1410 is used as the primary factor. The determination of the anticipated gaze point 1420 and/or the computation of the proximity to such point 1420 may not be performed (or, if performed, may be used as a secondary factor). In particular, the eye tracking system may determine a distance between the location of the content change (or, similarly, the sub-area) and the direction of the saccade 1410 (e.g., the saccade direction). The distance can be between the center of the location (e.g., the center of the sub-area) or a point on the edge of the location (or, similarly, the sub-area) and closest to the saccade direction. If that distance is within a threshold distance, the sub-area is a potential candidate for the adjustment. If multiple sub-areas are candidates, the one having the smallest distance or the one closest to the anticipated gaze point 1420 (e.g., the landing point from the ballistic prediction) may be selected (e.g., the proximity to the landing point may be used as a secondary factor for the selection of one or multiple candidate sub-areas).

In another example, the proximity to the anticipated gaze point 1420, rather than to the saccade 1410, may be used as the primary factor. In particular, the eye tracking system may determine a distance between the location of the content change (or, similarly, the sub-area) and the anticipated gaze point 1420. The distance can be between the center of the location (e.g., the center of the sub-area) or a point on the edge of the location (or, similarly, the sub-area) and closest to the anticipated gaze point 1420. If that distance is within a threshold distance, the sub-area is a potential candidate for the adjustment. If multiple sub-areas are candidates, the one having the smallest distance or the one closest to the direction of the saccade 1410 may be selected.

In yet another example, a single proximity may be computed, rather than multiple proximities to the different content changes. In particular, upon determining the anticipated gaze point 1420, a search may be performed for a content change, where the search may originate from the anticipated gaze point 1420. The search may be iterative at incremental distances. For instance, a pixel increment (e.g., ten pixels) may be used to define a radius for search circle centered the anticipated gaze point 1420. If after the first search (e.g., with a ten pixel radius), no content change is found, the radius may be incremented based on the pixel increment (e.g., to twenty pixels). This incremental increase and search may be repeated until a content change is detected or until a maximum search distance is reached. In this example, the maximum search distance corresponds to a threshold distance. The pixel incremented can be predefined or can be dynamically defined based on a number of factors, such as the confidence in the saccade estimation, the speed of the saccade, and/or the acceleration of the saccade.

In the above examples, if the two factors (proximity to the saccade 1410 and proximity to the anticipated gaze point 1420) could not resolve a selection of one particular candidate sub-area (e.g., two or more sub-areas have the same proximities), the selection can be random, the sub-area having the largest surface can be selected (assuming that, given its size, this sub-area would be the one that most likely attracted the user), the sub-area having the largest difference relative to the content change threshold can be selected (assuming that, given its amount of change, this sub-area would be the one that most likely attracted the user), an averaging of such sub-areas can be used, or such sub-areas can be discarded.

In an example, the distance threshold used to determine proximity to the saccade 1410 may, but need not, be the same as the distance threshold used to determine proximity to the anticipated gaze point. Regardless, each of the distance thresholds can be predefined. Alternatively, each of the distance thresholds can be dynamically defined based on the saccade. For instance, the faster the saccade was, the smaller a threshold distance can be made.

As illustrated in FIG. 14, a first distance 1460 between the location of the first content change (or, similarly, the first sub-area 1430) and the direction of the saccade 1410 is determined. This first distance 1460 indicates the proximity of the first sub-area 1430 to the direction of the saccade 1420. Similarly, a second distance 1470 between the location of the first content change (or, similarly, the first sub-area 1430) and the anticipated gaze point 1420 is determined. This second distance 1470 indicates the proximity of the first sub-area 1430 to anticipated gaze point 1420. Similar distances may be measured for the location of the second content change (or, similarly, the second sub-area 1440). Such distances may be compared to corresponding distance thresholds to select one of the sub-areas 1430 or 1440 (or, similarly, one of the content changes or one of the locations of such changes). If both sub-areas 1430 and 1440 are selected (e.g., because the corresponding distances to the saccade direction and/or to the landing point are smaller than the distance thresholds), such distances can be compared relative to each other to select one of the sub-areas 1430 or 1440. For example, and as illustrated in FIG. 14, the first sub-area 1430 is selected and the predicted gaze point 1450 is adjusted to fall within it based on the first distance 1460 being smaller than the distance threshold and being smaller than the equivalent distance between the second sub-area 1440 and the saccade direction.

Other factors may also be used to select a sub-area (or, similarly, a particular change in the content or the corresponding location of this content change). In an example, a speed of the saccade can be used. For instance, if the two sub-areas 1430 and 1440 are within a threshold distance to the saccade 1410 and/or to the anticipated gaze point 1420, the speed of the saccade may be used to select one of these two sub-areas. For instance, if the speed falls below a predefined speed threshold, the selection can be made for the sub-area closest to the saccade 1410 or to the anticipated gaze point 1420.

Figure 15:
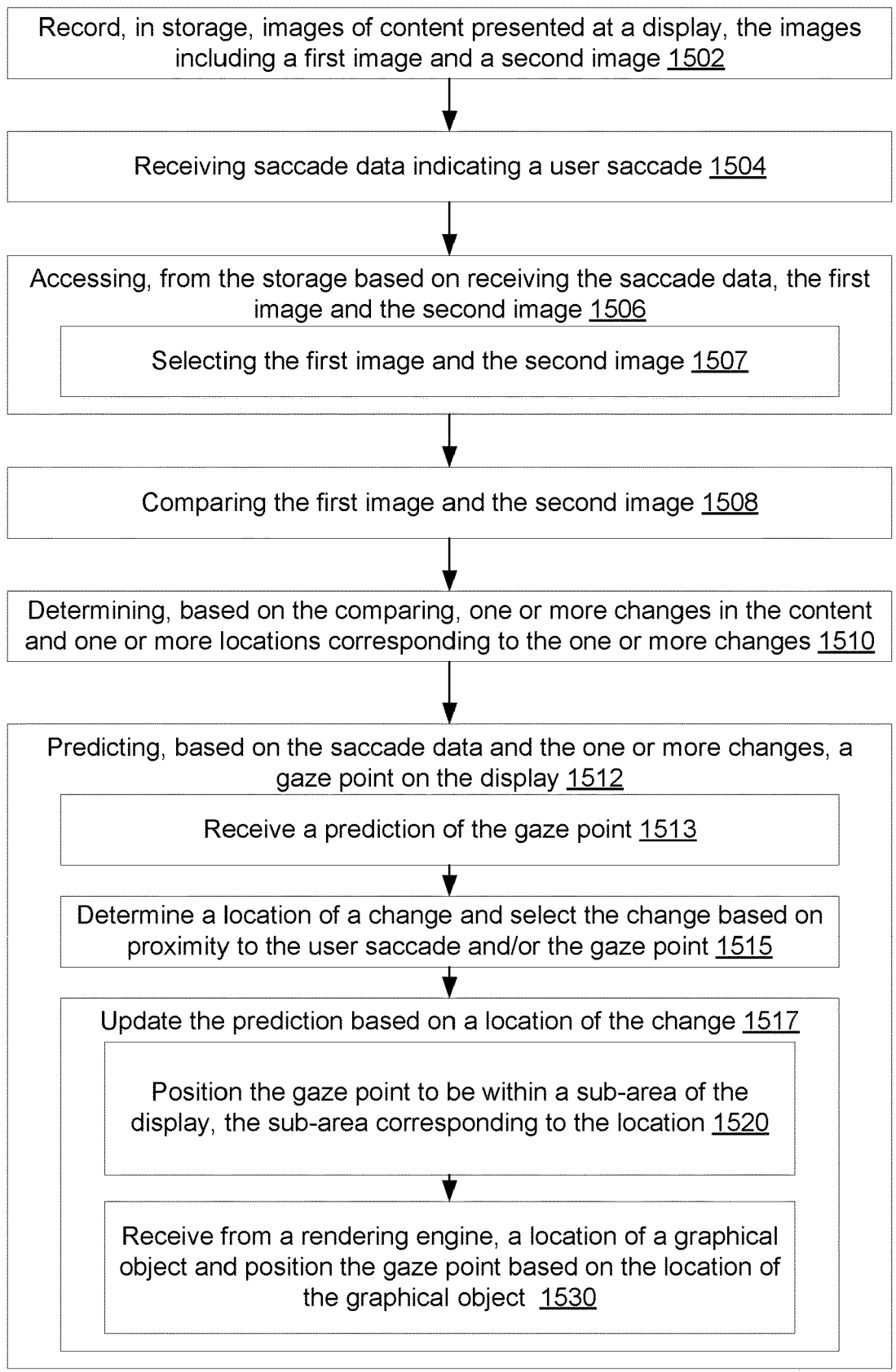
FIG. 15 is flow diagram of one possible method of the invention for adjusting a gaze prediction based on content change.

FIG. 15 is flow diagram of one possible method of the invention for adjusting a gaze prediction based on content change. The method may be implemented by an eye tracking system. In particular, instructions for performing steps of the method can be stored as computer-readable instructions on a non-transitory computer-readable medium of the eye tracking system. As stored, the instructions represent programmable modules that include code or data executable by processors of the eye tracking system. The execution of such instructions configures the eye tracking system to perform the specific steps shown in the figures and described herein. Each programmable module in combination with the processor represents a means for performing a respective step(s). While the steps are illustrated in a particular order, it should be understood that no particular order is necessary and that one or more steps may be omitted, skipped, and/or reordered.

As illustrated, the method starts at step 1502, where the eye tracking system records, in storage, images of content presented at a display. In an example, the images include a first image and a second image. Each of such images is a lower resolution snapshot of the content at a different point in time.

At step 1504, the eye tracking system receives saccade data indicating a user saccade on the display. In an example, the saccade data may be generated based on gaze tracking of the user eyes and may include, speed, acceleration, and/or direction of the user saccade. This data may be used for ballistic prediction to determine a landing point of the saccade, where this landing point represents an anticipated gaze point on the display. In another illustration, a landing point may not be predicted. In this illustration, proximity to the user saccade may be sufficient to determine a predicted gaze point.

At step 1506, the eye tracking system accesses, from the storage and based on receiving the saccade data, the first image and the second image among other possible images. In an example, the receipt of the saccade data may trigger a selection of particular images including the first and second images, as illustrated in sub-step 1507. The selected images are retrieved from the storage and further processed.

At sub-step 1507, the eye tracking system selects the first image and the second image for retrieval from the memory. Different selection factors may be used including based on the start time of the user saccade, the type of the memory (e.g., a circular memory buffer), and/or predefined time intervals or frame intervals as described herein above in connection with FIG. 12.

At step 1508, the eye tracking system compares the first image and the second image. In an example, the comparison includes comparing properties of pixels in the first image and the second image, where the properties include at least one of: color or luminosity. If additional images were also retrieved, the images can also be compared.

At step 1510, the eye tracking system determines, based on the comparing, one or more changes in the content and one or more locations corresponding to the one or more changes. In an example, a change in the content is determined based on a comparison of a change in the properties of a subset of the pixels between the first image and the second image to a content change threshold. A location of this change is determined based on the subset of the pixels (e.g. corresponds to this subset). When the content is presented on the display, the location of the change corresponds to a sub-area of the display. The content change threshold can be predefined or is dynamically defined based on a time difference between the content change and a start time of the user saccade. As illustrated in connection with FIG. 14, multiple changes in the content can be determined, each having a location and corresponding to a sub-area of the display.

At step 1512, the eye tracking system predicts, based on the saccade data and the one or more changes in the content, a gaze point on the display. In an example, this gaze point is a predicted gaze point that represents an adjustment to a landing point, where the landing point is an output of the ballistic prediction. In particular, the ballistic prediction uses the saccade data to output the landing point and, based on proximity(ies) of the change(s) (or similarly, the corresponding sub-area(s) or content change location(s)) to the user saccade and/or the landing point, adjust this landing point such that the predicted gaze point falls within a sub-area, on an edge of the sub-area, or close to the sub-area. In another example, the predicted gaze point is based on the direction of the user saccade, without the reliance on the landing point. For instance, the predicted gaze point may be selected as a point within the sub-area, where this point is within a threshold distance relative to the direction of the user saccade. This step 1512 can include multiple sub-steps.

At sub-step 1513, the eye tracking system receives a prediction of a gaze point. In an example, this gaze point is the landing point output from the ballistic prediction.

At sub-step 1515, the eye tracking system determines a location of a change in the content and selects the change based on proximity to the user saccade and/or the gaze point. In an example, multiple changes in the content are possible, as illustrated in connection with FIG. 14. For each change, the eye tracking system determines its corresponding location and computes the distance between this location and the saccade and/or the landing point. Alternatively, a search may be performed looking for a content change within a threshold distance, where the search may use the landing point as the origin.

If a single change is detected, the eye tracking system determines whether its distance is within a threshold distance (e.g., whether the location of the change is within a threshold distance from the direction of the user saccade, and/or whether the location of the change is within a threshold distance from the landing point). If so, the eye tracking system updates the prediction such that the gaze point is predicted to be within a sub-area of the display corresponding to the location, as shown in connection with sub-step 1517.

If multiple changes are detected, the eye tracking system selects one of these changes first to then adjust the prediction. If a distance of a change is larger than the threshold distance, that change is discarded. If within the threshold, that change is a candidate for the adjustment. If multiple candidates are present, the one having the smallest distance is selected or a selection based on the speed of the saccade can be made, as illustrated in connection with FIG. 14. Once a particular change is selected, the eye tracking system updates the prediction such that the gaze point is predicted to be within a sub-area of the display corresponding to that particular change, as shown in connection with sub-step 1517.

At sub-step 1517, the eye tracking system updates the prediction based on the location of the change selected under sub-step 1515. In an example, this sub-step 1517 can include two operations.

At operation 1520, the eye tracking system positions the gaze point to be within the sub-area of the display, where the sub-area corresponds to the location of the change. In an example, the adjustment sets the gaze point at a predefined point within the sub-area, on proximity to the direction of the user saccade, based on proximity to the landing point, and/or based on the speed of the saccade, as described in connection with FIG. 13.

At operation 1530, the eye tracking system can, additionally or alternatively, receive, from a rendering engine, a location of a graphical object that is first presented in the content at a time associated with a start of the user saccade or that is moving with a presentation of the content at the time associated with the start of the user saccade. In an example, this rendering engine may be used to present the content, where the presented content includes the graphical object. Here, the presentation of this object is a change in the content. Rather than determining its location based on comparison of the two images, or to refine the location determination from the image comparison, the eye tracking system receives the relevant location information about the presentation of the graphical object from the rendering engine. This location is used, similarly to operation 1520, to adjust the prediction.

The invention has now been described in detail for the purposes of clarity and understanding. However, it will be appreciated that certain changes and modifications may be practiced within the scope of the appended claims.

What is claimed is:

1. A method implemented by an eye tracking system, the method comprising:
    recording, in storage, a first image and a second image of content presented at a display;
    receiving saccade data indicating a user saccade;
    accessing, from the storage and based on receiving the saccade data, the first image and the second image;
    comparing the first image and the second image accessed from the storage to determine a change in the content;
    predicting, based on the saccade data and the change in the content, a gaze point on the display,
    receiving a prediction for the gaze point;
    determining, based on the comparing, a location of the change, a second change in the content, and a second location of the second change;
    determining a first distance between the location of the change and the user saccade and a second distance between the second location of the second change and the user saccade;
    selecting the change based on a comparison of the first distance and the second distance; and
    updating, based on the selecting, the prediction based on the location of the change such that the gaze point is predicted to be within a sub-area of the display corresponding to the location.

2. The method of claim 1, further comprising:
    determining a location of the change based on the comparing of the first image and the second image, wherein the gaze point is predicted based on the location of the change.

3. The method of claim 2, wherein predicting the gaze point comprises:
    receiving a prediction for the gaze point, wherein the prediction is based on the saccade data;
    determining, based on the saccade data, that the location of the change is within a threshold distance from a direction of the user saccade; and
    updating, based on the location being within the threshold distance, the prediction such that the gaze point is predicted to be within a sub-area of the display corresponding to the location.

4. The method of claim 1, wherein the first image and the second image correspond to presented frames of the content.

5. The method of claim 4, wherein comparing the first image and the second image comprises comparing properties of pixels in the first image and the second image, wherein the properties comprise at least one of: color or luminosity.

6. The method of claim 5, wherein the change in the content is determined based on a comparison of a change in the properties of a subset of the pixels between the first image and the second image to a content change threshold, and wherein a location of the change is determined based on the subset of the pixels.

7. The method of claim 6, wherein the content change threshold is dynamically defined based on a time difference between the content change and a start time of the user saccade.

8. The method of claim 4, wherein each of the first image and the second image has a lower image resolution than the presented frames of the content.

9. The method of claim 1, further comprising:
    receiving a prediction for the gaze point;
    determining, based on the comparing, a location of the change, a second change in the content, and a second location of the second change;
    determining that the location of the change and the second location of the second change are within a threshold distance of the user saccade;
    selecting the change based on a speed of the user saccade being less than a speed threshold;
    updating, based on the selecting, the prediction based on the location of the change such that the gaze point is predicted to be within a sub-area of the display corresponding to the location.

10. The method of claim 1, wherein the change is presented within a sub-area of the display, and wherein predicting the gaze point comprises:
    receiving a prediction for the gaze point; and
    updating the prediction based on the change such that the gaze point is predicted to be within the sub-area of the display.

11. The method of claim 10, wherein updating the prediction comprises positioning the gaze point to be within the sub-area of the display based on a speed of the user saccade.

12. The method of claim 10, wherein updating the prediction comprises positioning the gaze point to be within the sub-area of the display based on a saccade landing position indicated by the user saccade.

13. The method of claim 1, wherein the content is presented in frames, wherein the first image corresponds to a most recent frame, and wherein the second image corresponds to a preceding frame.

14. The method of claim 1, wherein the content is presented in frames, wherein the first image corresponds to a first frame, wherein the second image corresponds to second frame that precedes the first frame, and further comprising: selecting the second image based on a start of the user saccade.

15. The method of claim 1, further comprising:
receiving, from a rendering engine, a location of a graphical object that is first presented in the content at a time associated with a start of the user saccade or that is moving with a presentation of the content at the time associated with the start of the user saccade, wherein the gaze point is further predicted based on the location of the graphical object.

16. One or more non-transitory computer-readable storage media comprising instructions, that upon execution on a system, cause the system to perform steps comprising:
recording, in storage, a first image and a second image of content presented at a display;
receiving saccade data indicating a user saccade;
accessing, from the storage and based on receiving the saccade data, the first image and the second image;
comparing the first image and the second image accessed from the storage to determine a change in the content;
predicting, based on the saccade data and the change in the content, a gaze point on the display;
receiving a prediction for the gaze point;
determining, based on the comparing, a location of the change, a second change in the content, and a second location of the second change;
determining a first distance between the location of the change and the user saccade and a second distance between the second location of the second change and the user saccade;
selecting the change based on a comparison of the first distance and the second distance;
updating, based on the selecting, the prediction based on the location of the change such that the gaze point is predicted to be within a sub-area of the display corresponding to the location.

17. The one or more non-transitory computer-readable storage media of claim 16, wherein the steps further comprise:
determining a location of the change based on the comparing of the first image and the second image, wherein the gaze point is predicted based on the location of the change.

18. A system comprising:
one or more processors; and
one or more non-transitory computer-readable storage media comprising instructions, that upon execution by the one or more processors, configure the system to:
record, in storage, a first image and a second image of content presented at a display;
receive saccade data indicating a user saccade;
access, from the storage and based on receiving the saccade data, the first image and the second image;
compare the first image and the second image accessed from the storage to determine a change in the content; and
predict, based on the saccade data and the change in the content, a gaze point on the display;
receive a prediction for the gaze point;
determine, based on the comparing, a location of the change, a second change in the content, and a second location of the second change;
determine a first distance between the location of the change and the user saccade and a second distance between the second location of the second change and the user saccade;
select the change based on a comparison of the first distance and the second distance;
update, based on the selecting, the prediction based on the location of the change such that the gaze point is predicted to be within a sub-area of the display corresponding to the location.

19. The system of claim 18, wherein predicting the gaze point comprises:
receiving a prediction for the gaze point, wherein the prediction is based on the saccade data;
determining, based on the saccade data, that a location of the change is within a threshold distance from a direction of the user saccade; and
updating, based on the location being within the threshold distance, the prediction such that the gaze point is predicted to be within a sub-area of the display corresponding to the location.

* * * * *